United States Patent
Taheri et al.

(10) Patent No.: US 12,222,623 B2
(45) Date of Patent: Feb. 11, 2025

(54) LASER-PROTECTION VARIABLE TRANSMISSION OPTICAL DEVICE

(71) Applicant: ALPHAMICRON INCORPORATED, Kent, OH (US)

(72) Inventors: Bahman Taheri, Shaker Heights, OH (US); Ludmila Sukhomlinova, Kent, OH (US); Antonio Munoz, Shaker Heights, OH (US); Joseph Angelo, Kent, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 18/505,144

(22) Filed: Nov. 9, 2023

(65) Prior Publication Data

US 2024/0077777 A1    Mar. 7, 2024

Related U.S. Application Data

(63) Continuation-in-part of application No. 18/369,843, filed on Sep. 19, 2023, which is a continuation-in-part
(Continued)

(51) Int. Cl.
*G02F 1/137* (2006.01)
*G02F 1/1347* (2006.01)

(52) U.S. Cl.
CPC .......... *G02F 1/137* (2013.01); *G02F 1/1347* (2013.01)

(58) Field of Classification Search
CPC .... G02F 1/137; G02F 1/1347; G02F 1/13475; G02F 1/13725
See application file for complete search history.

(56) References Cited

U.S. PATENT DOCUMENTS 5,212,585 A * 5/1993 Ning ................ A61F 9/023
                                                     359/276
5,943,104 A   8/1999 Moddel et al.
(Continued)

FOREIGN PATENT DOCUMENTS

WO   WO-9715256 A1 *  5/1997  ............ A61F 9/067
WO   2022047371 A1    3/2022
WO   2023014756 A1    2/2023

OTHER PUBLICATIONS

International Search Report and Written Opinion received for International Application No. PCT/US22/44310, mailed on Jan. 3, 2023. (12 Pages).

(Continued)

*Primary Examiner* — Donald L Raleigh
(74) *Attorney, Agent, or Firm* — AlaviIP LLC

(57) ABSTRACT

A laser protection variable transmission optical device ("LP-VTOD") includes first and second cells, each capable of changing from a state of higher light transmittance to a state of lower light transmittance. The first cell is characterized by a narrow band absorption having a first peak absorption wavelength and a first FWHM of 175 nm or less, and the second cell is characterized by a narrow band absorption having a second peak absorption wavelength and a second FWHM of 175 nm or less. The first peak absorption wavelength may be the same or different than the second peak absorption wavelength. The LP-VTOD is capable of switching from a clear state to a darkened state having a darkened state transmittance % $T_{DS\text{-}P}$ that is equal to or less than 10% for at least one of the first or second peak absorption wavelengths.

34 Claims, 9 Drawing Sheets

Related U.S. Application Data of application No. PCT/US2022/044310, filed on Sep. 22, 2022.

(60) Provisional application No. 63/246,940, filed on Sep. 22, 2021.

(56) References Cited

U.S. PATENT DOCUMENTS

| | | |
|---|---|---|
| 6,214,990 B1 | 4/2001 | Tanaka et al. |
| 6,999,220 B2 | 2/2006 | Kosa et al. |
| 7,102,602 B2 | 9/2006 | Kim et al. |
| 7,567,306 B2 | 7/2009 | Park et al. |
| 7,811,482 B2 | 10/2010 | Miller et al. |
| 8,016,415 B2 | 9/2011 | Figler et al. |
| 8,562,130 B2 | 10/2013 | Kosa et al. |
| 8,736,805 B2 | 5/2014 | Borenstein et al. |
| 9,034,457 B2 | 5/2015 | Su et al. |
| 9,102,652 B2 | 8/2015 | Sukhomlinova et al. |
| 9,116,370 B2 | 8/2015 | Taheri et al. |
| 9,130,097 B2 | 9/2015 | Taheri et al. |
| 9,134,551 B2 | 9/2015 | Sukhomlinova et al. |
| 9,200,203 B2 | 12/2015 | Sukhomlinova et al. |
| 9,303,209 B2 | 4/2016 | Munoz et al. |
| 9,304,333 B2 | 4/2016 | Taheri |
| 9,335,565 B2 | 5/2016 | Miller, IV et al. |
| 9,513,524 B2 * | 12/2016 | Soto .................. G02F 1/13725 |
| 9,869,887 B2 | 1/2018 | Taheri et al. |
| 9,918,508 B2 | 3/2018 | Ryan et al. |
| 10,095,052 B2 | 10/2018 | Bhatta et al. |
| 10,310,349 B2 | 6/2019 | Taheri et al. |
| 10,401,690 B2 | 9/2019 | Baker et al. |
| 10,914,991 B2 | 2/2021 | Miller, IV et al. |
| 11,086,184 B1 | 8/2021 | Bergh et al. |
| 11,194,208 B2 | 12/2021 | Soto et al. |
| 11,435,610 B2 | 9/2022 | Miller, IV et al. |
| 11,500,255 B2 | 11/2022 | Taheri et al. |
| 2005/0036077 A1* | 2/2005 | Khan .................. G02F 1/13473 349/36 |
| 2008/0246900 A1 | 10/2008 | Taheri et al. |
| 2016/0070132 A1* | 3/2016 | Soto .................... G02F 1/13725 349/193 |
| 2017/0276960 A1 | 9/2017 | Osterman et al. |
| 2018/0164627 A1* | 6/2018 | Oh ............................ G02F 1/29 |
| 2018/0224689 A1* | 8/2018 | DeMiglio ........... G02F 1/13392 |
| 2019/0107736 A1* | 4/2019 | Gutierrez ............... G02C 7/049 |
| 2019/0306386 A1 | 10/2019 | Akkaya et al. |
| 2022/0100005 A1 | 3/2022 | Balasubramanian et al. |
| 2023/0175139 A1* | 6/2023 | Fouliard .................. C23C 4/02 427/454 |

OTHER PUBLICATIONS

Specification MIL-PRF-32432A, Performance Specification Military Combat Eye Protection (MCEP) System, published Sep. 11, 2018, (63 Pages).

Soto, P. Thesis "Modeling and Characterization of Dye-Doped Guest-Host Liquid Crystal Eyewear" 2015, (149 Pages).

* cited by examiner

LASER-PROTECTION VARIABLE TRANSMISSION OPTICAL DEVICE

CROSS-REFERENCE TO RELATED APPLICATIONS

This application is a Continuation-in-Part of U.S. Non-Provisional patent application Ser. No. 18/369,843 entitled COLOR-PRESERVING VARIABLE TRANSMISSION OPTICAL DEVICE, filed on Sep. 19, 2023, which is a Continuation-in-Part of PCT/US22/44310 entitled MULTI-COLOR VARIABLE TRANSMISSION OPTICAL, DEVICE, filed on Sep. 22, 2022, which claims priority to, and any other benefit of, U.S. Provisional Patent Application Ser. No. 63/246,940 entitled MULTI-COLOR VARIABLE TRANSMISSION OPTICAL DEVICE, Filed Sep. 22, 2021, the entire disclosures of which are fully incorporated herein by reference.

TECHNICAL FIELD

The present disclosure relates to optical devices, particularly variable transmissive optical devices that may be reversibly switched between clear and darkened states especially to block narrowband radiation such as laser light.

BACKGROUND

Variable transmission optical devices ("VTODs"), e.g., glasses, goggles, visors, windows, sensors, filters, cameras, or the like, that can quickly change between a high-transmission "clear" state and a low-transmission "dark" state have many advantages over fixed transmission optical devices. An especially useful feature is the ability to make this quick change occur on demand, whether manually, at the touch of a button by the user, or automatically, under the control of a light sensor and an electronic circuit.

Optical devices can potentially offer protection from intense light, e.g., from narrow beam light sources such as lasers. For example, the military, police, first responders, pilots and others can face threats from laser light wielded by hostile persons or devices. Defending against laser light has been difficult and solutions to date have been largely unsatisfactory. For example, a common approach (for green lasers) has been simply to provide a static green-light absorbing strip at a top portion of a face shield. This only provides protection against green lasers and only if the person wearing it has their head properly angled. Furthermore, the system will continue to block that region of the spectrum regardless of the presence or absence of the threat. This can lead to color distortions which do not meet the optical requirements for general use. In the case of pilots, a static tinted film that blocks the green laser is undesirable because it can also dim aviator vision and filter out cockpit displays and additionally, impair the pilots ability to properly view PAPI (Precision Approach Path Indicator) or VASI (Visual Approach Slope Indicator) lights which require red/white or red/green differentiation.

Variable transmission optical devices can also provide some protection from intense light. However, it has been difficult to formulate such devices to have sufficient optical density for satisfactory protection against lasers. For some applications, it is important that a scene viewed through the optical device is not obscured when the device is moved between clear and various darkened states. To reach sufficient optical densities to protect against lasers (e.g., having an Optical Density "OD" of 1 or more at the laser wavelength), the scene becomes unacceptably dim overall in wavelength regions outside the laser.

Thus, there is a need to provide a variable transmission optical system (e.g., filters, lenses, goggles, visors, face shields, windows, windshields, AR or VR glasses, or the like) that can protect against intense narrow band light while maintaining sufficient light transmission spectral regions other than the laser light.

SUMMARY

In accordance with some embodiments, a laser protection variable transmission optical device ("LP-VTOD") includes a first and second cells. The first cell includes a first electro-optic material provided between a first pair of substrates. The first electro-optic material is capable of changing from a state of higher light transmittance to a state of lower light transmittance in a first wavelength region upon a change in a first electric field applied across the first electro-optical material. The first cell is characterized by a narrow band absorption having a first peak absorption wavelength and a first FWHM of 175 nm or less. The second cell is in optical communication with the first cell, the second cell and includes a second electro-optic material provided between a second pair of substrates. The second electro-optic material is capable of changing from a state of higher light transmittance to a state of lower light transmittance in a second wavelength region upon a change in a second electric field applied across the second electro-optical material. The second cell is characterized by a narrow band absorption having a second peak absorption wavelength and a second FWHM of 175 nm or less. The first and second peak absorption wavelengths may be the same or different. The LP-VTOD is capable of switching from a clear state to a darkened state having a darkened state transmittance % $T_{DS-P}$ that is equal to or less than 10% for at least one of the first or second peak absorption wavelengths.

DETAILED DESCRIPTION

Figure 1:
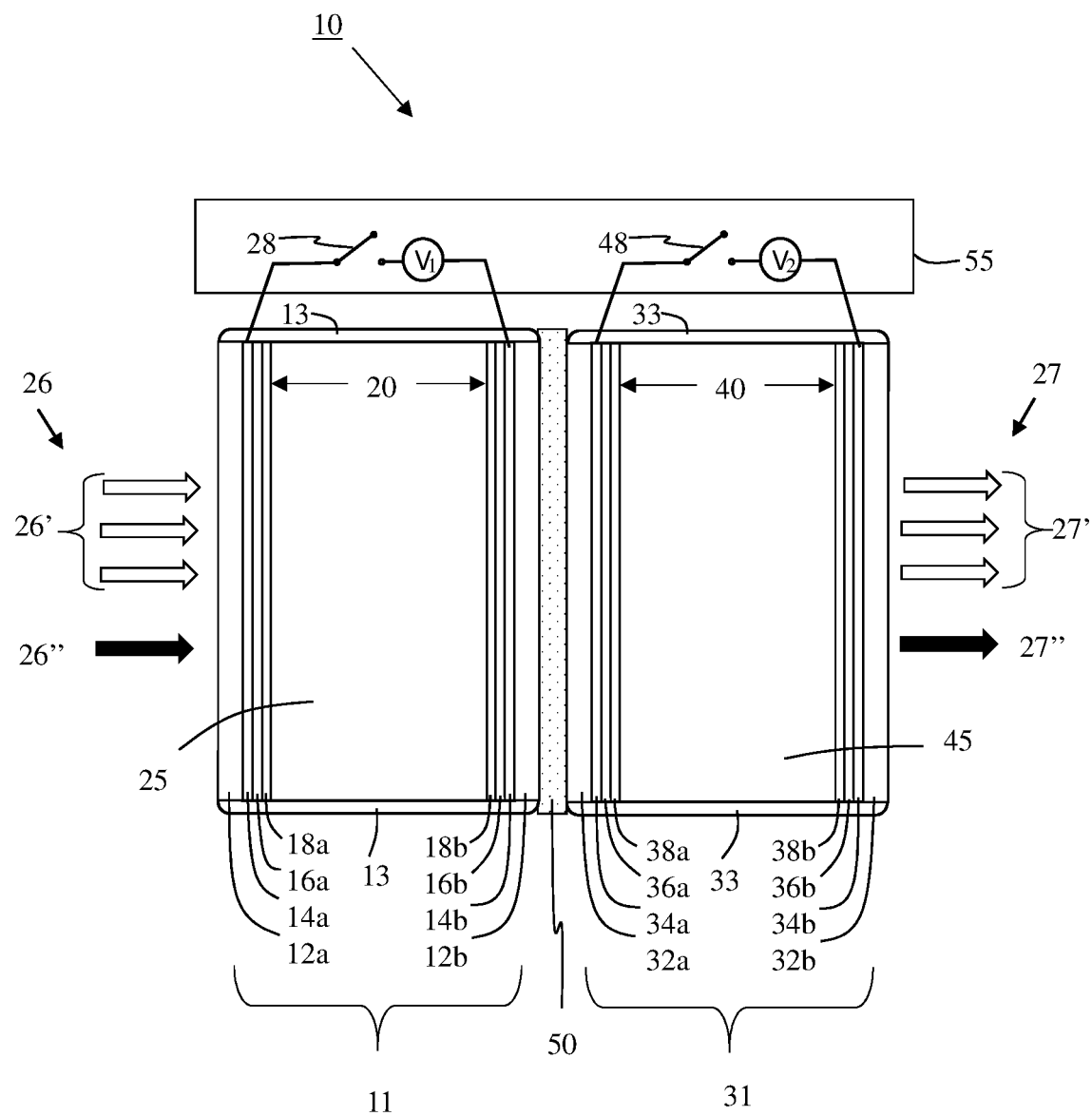
FIG. 1 is a cross-sectional view of a non-limiting example of a Laser Protection Variable Transmission Optical Device ("LP-VTOD") according to some embodiments.

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. It is to be understood that the drawings are for purposes of illustrating the concepts of the disclosure and may not be to scale.

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4."

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients, components, or steps, and that permit the presence of other ingredients, components, or steps.

The present disclosure may include one or more of the following terms whose meanings may be as described below.

"Absorption" as used herein may define the percentage of light absorbed by the mixture, cell or optical device.

"Absorption band" may define the spectral wavelength wherein absorption occurs.

"Clear state" or "clear state transmission", as used herein, may refer to the state where LP-VTOD exhibits high or maximal light transmittance.

"Darkened state" or "darkened state transmission" may refer to the state where VTOD exhibits reduced light transmittance relative to the clear state.

A "Dichroic Dye" or "DC Dye" is a light-absorbing dye moiety that typically has a rodlike shape and displays a unique anisotropy in which its light absorption properties occur parallel ($\alpha_{\parallel}$) and perpendicular ($\alpha_{\perp}$) to the molecule, this being characterized by the dichroic ratio, $DR=\alpha_{\parallel}/\alpha_{\perp}$. Any molecule that has a dichroic ratio (DR) is one that exhibits "dichroism".

"Dye order parameter" or "Say," refers to the order parameter of the transition dipole of each dichroic dye with respect to the director.

"Dichroic ratio", or $D_{mix}$ of a dye mixture refers to the dichroic ratio of the guest-host mixture, which may contain one or more DC dyes, at the peak absorbance wavelength of the mixture, or dye, as applicable.

"Narrow Band Absorption" as used herein, is defined as a spectral absorption band width with a Full Width at Half Max (FWHM) that is less than or equal to 175 nm, or alternatively less than or equal to 165 nm, 155 nm, 120 nm, 100 nm, 80 nm, 70 nm, 60 nm, 50 nm, 40 nm, 30 nm, 20 nm, or 10 nm where the entire spectral absorption band is typically measured within the visible region of 400-700 nm, or alternatively 380 nm-780 nm. Narrow band absorption may in some cases have a high color chromaticity.

"Ultra-Narrow Band Absorption" is a subset of "narrow band absorption" and as used herein is defined as a spectral absorption band width with FWHM that is less than or equal to 88 nm, or alternatively less than or equal to 80 nm, 70 nm, 60 nm, 50 nm, 40 nm, 30 nm, 20 nm, or 10 nm or less where the entire spectral absorption band is typically measured within the visible region of 400-700 nm, or alternatively 380 nm-780 nm. Ultra-narrow band absorption may in some cases have a high color chromaticity.

"Narrow Band Mixture" refers to a guest-host liquid crystal mixture that can be used in a narrow band cell to produce a narrow band absorption, which may optionally be an ultra-narrow band absorption (an ultra-narrow band mixture).

"Narrow Band Cell" refers to a device capable of producing a narrow band absorption, which may optionally be an ultra-narrow band absorption.

"Narrowband radiation" refers to radiation incident on the LP-VTOD having a wavelength bandwidth less than 88 nm, alternatively less than 80, 70, 60, 50, 40, 30, 20, 15, 10, 9, 8, 7, 6, 5, 4, 3, 2, or 1 nm. In some cases, bandwidth may correspond to a full-width-at-half-max (FWHM) of a spectrum of relative radiant power vs. wavelength. "Ultra-narrowband radiation is a subset of narrowband radiation and refers to the incident light having a bandwidth of less than 40 nm, alternatively less than 30, 20, 15, 10, 9, 8, 7, 6, 5, 4, 3, 2, or 1 nm. Narrowband radiation, which may optionally be ultra-narrowband radiation, may in some cases include light produced from a laser (laser radiation or laser light), surface-mounted diodes (SMDs) or some LEDs and the like.

"Nematic-isotropic transition temperature" or $T_{NI}$ is the temperature at which the liquid crystal undergoes the nematic to isotropic transition, which is the transition from the orientationally ordered nematic phase to the totally disordered isotropic phase. As used herein, $T_{NI}$ refers to the nematic-isotropic transition temperature of the guest-host mixture.

"Order parameter of the guest-host mixture" or "$S_{mix}$" refers to the order parameter of the guest-host mixture at the peak absorbance wavelength of the mixture. The mixture may contain one or more dyes as well as other dopants.

Optical Density or OD generally refers to the apparent absorbance of radiation measured at a particular wavelength, e.g., at a peak dye absorption wavelength or a peak narrowband radiation wavelength. Percent transmittance (% T) is related to the overall OD at the particular wavelength through:

$$\%T = 10^{(-OD)} \times 100\%.$$

"Photopic transmittance" or "photopic transmission" refers to the percent transmission of visible light weighted by the spectral response of the day-adapted human eye.

"Polarization dependence" is a measure of a material's response to two orthogonal polarizations, i.e., where the optical properties of a material experienced by an incident light (such as index of refraction or absorption/transmittance) are dependent on the polarization of the incident light.

"Polarization sensitivity" is the relative measure of the response of the material between the two orthogonal polarizations. In ideal, theoretical limit, zero percent (0%) polarization sensitivity refers to a completely polarization insensitive device and a 100% polarization sensitivity refers to a completely polarization sensitive device as obtained using a polarizer.

"Polarizer" refers to a material, layer, or component that absorbs or reflects one polarization of incident light more than the orthogonal polarization.

"Transmission" and "Transmittance" are used interchangeably and mean the percentage of light that is transmitted through a mixture or device, and which may be referred to herein as a % T. In some cases, a transmittance may refer to a particular wavelength. For example, an LP-VTOD may be characterized by a transmittance at a peak absorbance wavelength in a clear state (% $T_{CS-P}$) or a transmittance at a peak absorbance wavelength in a darkened state (% $T_{DS-P}$). In some cases, a transmittance may refer to an average or integration across a range of wavelengths. For example, an LP-VTOD may be characterized by a photopic transmittance in a clear state ($PT_{CS}$) or a photopic transmittance in a darkened state ($PT_{DS}$).

"Transmission swing" refers to the difference in transmission between the clear state and darkened state transmissions. For example, if the clear state transmission is 65% and the darkened state transmission is 15%, the transmission swing is 65−15=40%. The transmission swing of an optical device (at a wavelength or across a range of wavelengths) can be determined by a spectrophotometer or measured using other specialized equipment such as a "Haze-Gard Plus" device from BYK-Gardner, USA, or equivalent.

"Tint" or "tinted" state refers to a condition where, relative to a clear state, the guest-host mixture exhibits some light absorption which may be narrow band absorption (<175 nm bandwidth) or wide-band absorption (>175 nm). A tinted state may correspond to a color state, or alternatively, may correspond to a low color chromaticity state.

"Uniform optical retardation" refers to plastic substrates having an optical retardation variation that is less than ±20%. "Optical retardation" is defined as the change in the optical phase experienced by different polarizations of incident light.

"Visible light" refers to a wavelength range of about 400 nm to about 700 nm, or alternatively about 380 nm to about 780 nm.

"Wide band absorption" as used herein, may refer to a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm, or alternatively 380 nm-780 nm. Wide band absorption may in some cases have a low color chromaticity.

"Wide Band Cell" refers to a device capable of producing a wide absorption band.

"Wide Band Mixture" refers to a guest-host liquid crystal mixture that can be used in a wide band cell.

Note that the terms "transmittance" and "transmission" may generally be used interchangeably herein.

Optical Device Overview

FIG. 1 is a cross-sectional view of a non-limiting example of a Laser-Protection Variable Transmission Optical Device ("LP-VTOD") according to some embodiments. Note that the term "laser-protection" is a term of convenience and not limiting. While an LP-VTOD may in some cases protect a user or device from laser light, in other cases an LP-VTOD may protect a user or device from some other narrowband radiation, e.g., produced from an LED, SMD or another light source.

In some embodiments, LP-VTOD 10 may include a first cell 11 in optical communication with a second cell 31 such that incident light 26 may be modulated by the first cell, by the second cell, or by both the first and second cells, and pass through the device as transmitted light 27. Incident light 26 may include a lower intensity component 26' that includes light of various wavelengths, e.g., broad band radiation across much of the visible spectrum. Incident light 26 may also include a higher intensity narrowband radiation component 26", e.g., light from a laser or an LED. Depending on how the LP-VTOD has modulated the light, transmitted light 27 may include a transmitted lower intensity component 27' corresponding to the portion of 26' that passes through the device and a transmitted narrowband radiation component 27" corresponding to the portion of 26" that passes through the device. The first and second cells may optionally be separated by layer 50, which may include, for example, an optically transparent adhesive, a polymer film, a glass layer, or an optical article such as a lens, a window, a visor or the like. In some embodiments, layer 50 may be selected to reduce insertion loss associated with interfaces. Note that the designation of "first" and "second" cells is arbitrary and interchangeable, i.e., in embodiments described herein, the second cell may instead first receive the incident light rather than the first cell.

Each cell may include a pair of substrates, 12a, 12b for the first cell, and 32a, 32b for the second cell. As discussed in more detail later, the substrates may be independently selected and include, for example, a polymeric material, a glass, or a ceramic. Each cell may include a pair of transparent conducting layers, 14a, 14b for the first cell, and 34a, 34b for the second cell, which may be provided or coated over each respective substrate surface interior to the cell. In some embodiments, an optional passivation layer (which in some cases may be referred to as an insulating layer or "hard coat"), 16a, 16b, 36a, 36b, may be provided over the respective transparent conducting layer. The passivation layer may include, for example, a non-conductive oxide, sol-gel, polymer, or a composite. An optional alignment layer 18a, 18b, 38a, 38b, may be provided over the passivation layer or the transparent conducting layer. As a non-limiting example, the alignment layer may include polyimide. In some embodiments, the alignment layer may function as a passivation layer. In some embodiments, the alignment layer may be brushed as is known in the art to assist in orienting the electro-optic material, e.g., a LC host, near the surface. In some embodiments, both alignment layers of a cell are brushed. In some embodiments, a cell may include only one brushed alignment layer.

Figure 2A:
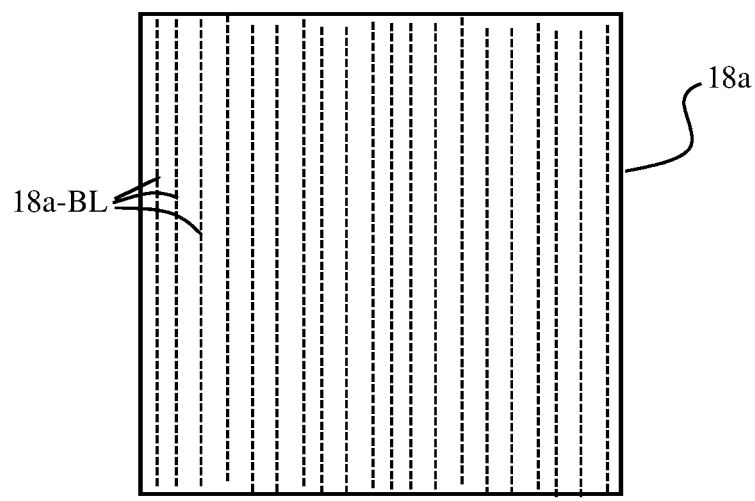
FIGS. 2A and 2B are schematic plan views illustrating the relative orientation of alignment layers between different cells according to some embodiments.
Figure 2B:
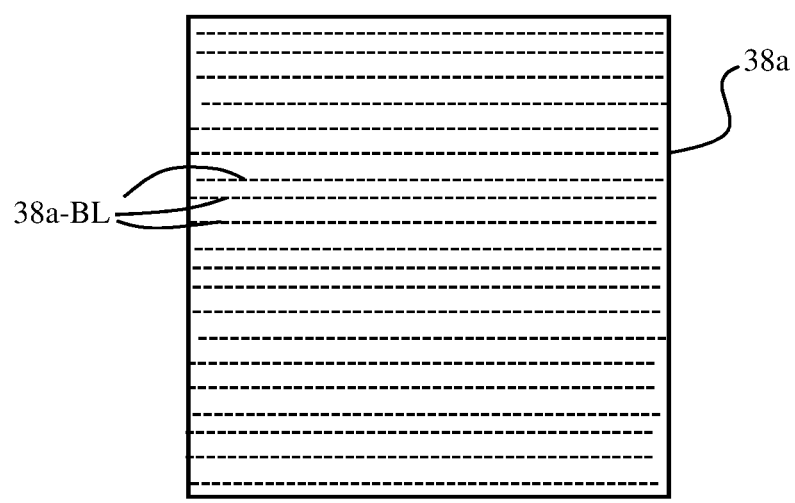

In some embodiments, an alignment layer of the first cell may have an orientation that is that is rotated, e.g., by 70 to 110 degrees, alternatively by 80 to 110 degrees, or alternatively 85 to 95 degrees, relative to an alignment layer of the second cell. For example, FIG. 2A is a schematic plan view of an alignment layer 18a showing alignment brush lines 18a-BL oriented approximately vertically. FIG. 2B is a schematic plan view of an alignment layer 38a showing alignment brush lines 38a-BL oriented approximately horizontally, i.e., at about 90 degrees relative to alignment layer 18a. Such a configuration may in some cases be capable of absorbing more light in its darkened state. While not being bound by theory, a first cell may absorb more of one polarization than the other, but by rotating the alignment, the second cell may be configured to absorb more of that other polarization.

The first cell 11 includes a first electro-optic material 25, e.g., a first liquid crystal guest-host mixture, provided between the first cell's pair substrates 12a, 12b. The substrates and any overlying layers define a first cell gap 20. The first electro-optic material is capable of changing from a state of higher light transmittance to a state of lower light transmittance in a first wavelength region upon a change in a first electric field applied across the first electro-optic material. The first electric field may be changed, for example, by changing the voltage applied between the first cell's pair of transparent conductive layers 14a, 14b. In some embodiments, the first electro-optic material and/or the first cell may in its state of lower light transmittance be characterized by a narrow band absorption having a first peak absorbance wavelength and a first FWHM. In some embodiments, the narrow band absorption of the first cell may be an ultra-narrow band absorption as previously described.

Similarly, second cell 31 includes a second electro-optic material 45, e.g., a second liquid crystal guest-host mixture that may be the same as or different from the first liquid crystal guest-host mixture, provided between the second cell's pair of substrates 32a, 32b. The second electro-optic material is capable of changing from a state of higher light transmittance to a state of lower light transmittance in a second wavelength region, that may be substantially the same as or different from the first wavelength region, upon a change in a second electric field applied across the second electro-optic material. The second electric field may be changed, for example, by changing the voltage applied between the second cell's pair of transparent conductive layers 34a, 34b. In some embodiments, the second electro-optic material and/or the second cell may in its state of lower light transmittance be characterized by a narrow band absorption having a second peak absorbance wavelength and a second FWHM. In some embodiments, the narrow band absorption of the second cell may be an ultra-narrow band absorption as previously described. In some preferred embodiments, one or both of the first and second peak absorbance wavelengths is in a range of 380-780 nm, or alternatively 400-700 nm. The substrates and any overlying layers define a second cell gap 40. Second cell gap 40 may be the same or different than cell gap 20. To aid in maintaining the separation, optional spacers (not shown), such as glass or plastic rods or beads, may be inserted between the respective substrates for each cell.

In some cases, the first and second cell structures may be enclosed by sealing material 13, 33 such as a UV-cured optical adhesive or other sealants known in the art. Sealing material 13 and 33 may be the same or different. FIG. 1 shows the sealing materials of the first and second cells as separate, but in some embodiments, a single common sealing material layer may instead seal both cells. It is to be appreciated that sealing material 13, 33, may be provided anywhere to create a seal for electro optic material 25, 45, between the substrates 12a,12b, 32a, 32b. For example and without limitation, sealing material may be placed between the substrates 12a, 12b, 32a, 32b and any overlying layers. In some embodiments, the sealing material may include spacers for maintaining cell gap 20, 40.

The conducting layers of each cell 14a, 14b, 34a, 34b, may be electrically connected to a controller 55. Controller 55 may include one or more variable voltage supplies which are represented schematically by the encircled $V_1$ and $V_2$, for the first cell and second cell, respectively. FIG. 1 shows a first cell power circuit with its switch 28 open so that no voltage is applied. When switch 28 is closed, a variable voltage or electric field may be applied across liquid crystal guest-host mixture 25. Similarly, a second cell power circuit is shown with its switch 48 in an open position so that no voltage is applied. When switch 48 is closed, a variable voltage or electric field may be applied across liquid crystal guest-host mixture 45. In some embodiments, the electric field applied across the first cell may be independently controlled relative to the electric field applied across the second cell. Independent control may in some cases allow more options in how the VTOD filters light. In some other embodiments, the electric field applied across the first and second cells are commonly controlled, e.g., by simultaneous application of the same voltage profile across each set of electrodes of the first and second cells. In some embodiments, one electrode of the first cell is in electrical communication with one electrode of the second cell, and the other electrode of the first cell is in electrical communication with the other electrode of the second cell. Common control may in some cases be simpler and allow lower cost controllers to be used.

In some embodiments (not shown), rather than including layer 50, the second and first cells may share a substrate, e.g., substrate 12b, such that the transparent conducting layer 34a (and optionally other layers 36a and/or 38a), are provided on the substrate surface opposite to that having transparent conducting layer 14b of the first cell. Such a structure in some cases may reduce possible optical losses. Note that any or all of substrates 12a, 12b, 32a, 32b may be the same or different, any or all transparent conducting layers 14a, 14b, 34a, 34b may be the same or different, any or all of optional passivation layers 16a, 16b, 36a, 36b may be the same or different, and any or all of optional alignment layers 18a, 18b, 38a, 38b may be the same or different. In some embodiments, one or both cells include only one alignment layer.

Electro-Optic Material

An electro-optic material is one capable of changing its light absorption profile upon application of an electric field. In some embodiments, the electro-optic material includes a guest-host system having an LC host and a DC dye (guest) dissolved or dispersed therein, or alternatively a dichroic light absorbing moiety covalently attached to the LC host (all considered a guest-host mixture). Unless otherwise noted, the term "DC dye" includes any DC light absorbing material, whether provided as a small molecule or as a moiety attached to a polymer, to an oligomer, or to the LC host.

A guest-host system may be used to produce an electro-optic effect that involves a mixture of dichroic dye "guest" and liquid crystal "host" wherein the dichroism is adjusted within a voltage-controllable liquid crystal cell. In an isotropic host, the molecules are randomly oriented, and the effective absorption is a weighted average: $\alpha_{eff}=(2\alpha\perp+\alpha\|)/3$. In an anisotropic LC host material, designed for polarization independent operation, the absorption can be increased to $\alpha_{eff}=(\alpha\perp+\alpha\|)/2$ or decreased to al, depending on the desired effect.

In some embodiments, a liquid crystal guest-host includes a mixture of a liquid crystal host and a dyestuff material (also referred to herein as a DC dye composition). The DC dye composition may be characterized as having dichroic properties, and as described below, may include a single DC dye or a mixture of DC dyes to provide these properties. In some embodiments, the liquid crystal guest-host mixture may be formulated as a "narrow band mixture". In some embodiments, at least one cell 11, 31 includes a narrow band mixture as electro-optic material 25, 45. Note that the term "mixture" in the context of guest-host materials is generally used broadly herein, and may refer to a DC light absorbing moiety covalently attached to the LC host. A guest-host mixture may be, but is not necessarily, a simple combination of separate dye and liquid crystal molecules.

In some embodiments, the first and second cells include narrow band mixtures that have substantially the same optical performance, i.e., peak absorption wavelength, FWHM absorption band and overall absorbance. In these embodiments, one cell is configured to substantially absorb one polarization or eigenmode of light, while the other cell is configured to substantially absorb the other (orthogonal) polarization or eigenmode of light.

For example, at least 90% by weight of the chemical components of the first electro-optic material may have the same molecular/polymer structure as at least 90% by weight of the components of the second electro-optic material (excluding chiral dopants). In some cases, an elemental analysis of the first electro-optic material may be within 10% (atomic % or weight %) for each element relative to an elemental analysis of the second electro-optic material. In some cases, the spectral properties of the first and second cells may be substantially the same. For example, the first peak absorbance wavelength may be within 10%, or 5%, of the second peak absorbance wavelength, or the first FWHM may be within 10%, or 5%, of the second FWHM. An advantage of this combination is that the system can be very effective at blocking a target wavelength, e.g., from a laser, irrespective of its polarization. Alternatively, it is possible to increase the overall absorbance overcoming the potential solubility limitation in each cell. It has been found that two similar cells stacked together can be more effective than trying to double the cell gap or dye concentration since it can address both eigenmodes. For example, it has been found that using two cells having substantially the same mixture can provide an optical density of at least 1.0, alternatively, at least 1.5, 2.0, 2.5, 3.0, 3.5, or even higher. Such levels can be particularly important for blocking high intensity narrow band light such as laser light.

In some embodiments, each cell includes a narrow band mixture (one or both of which may optionally be an ultra-narrow band mixture) that is different from the other cell in some way. In general, different mixtures are those that are not "substantially the same" as described above. For example, the first DC dye composition may be different than the second DC dye composition. In some cases, a different chromophore or a different mixture of chromophores may be used. In some cases, the first peak absorption wavelength is different than the second peak absorption wavelength, e.g., by at least 5 nm or 10 nm, or alternatively by at least 5% or 10%, or the first FWHM may be different from the second FWHM, e.g., by at least 5 nm or 10 nm, or alternatively by at least 5% or 10%. In some cases, the peak absorption wavelengths are different such that each cell absorbs a different region of the spectrum (e.g., one cell absorbs red and the other absorbs green light, or any other combination of colors as applicable. In some cases, a different host material may be used for the first electro-optic material relative to the second electro-optic material. An advantage to using two cells that are different is that the VTOD can block multiple wavelengths at the same time, e.g., from red and green lasers.

LC Host

In some embodiments, the host includes a chiral nematic or cholesteric liquid crystal material (collectively "CLC") which may have a negative dielectric anisotropy ("negative CLC") or a positive dielectric anisotropy ("positive CLC"). In some embodiments of the CLC, the liquid crystal material is cholesteric, or it includes a nematic liquid crystal in combination with a chiral dopant. A CLC material has a twisted or helical structure. The periodicity of the twist is referred to as its "pitch" ("p"). The orientation or order of the liquid crystal host may be changed upon application of an electric field, and in combination with the dyestuff material, may be used to control or partially control the optical properties of the cell 11, 31. In some embodiments, the CLC may be further characterized by its chirality, i.e., right-handed chirality or left-handed chirality.

A wide variety of CLC materials are available and have potential utility in various embodiments of the present disclosure.

In some embodiments, the LC host is a nematic LC (zero chiral) or a ferroelectric or smectic, and may have positive or negative dielectric anisotropy. It should be noted that a non-zero d/p can be achieved by using properly rubbed surfaces as is known in the art.

Dyestuff Material

In some embodiments, the dyestuff material may further include a small amount of a conventional absorbing dye, e.g., to provide the device with a desired overall hue in the clear state. In some embodiments, the dye composition includes substantially only DC dyes.

DC Dyes

Dichroic dyes typically have an elongated molecular shape and exhibit anisotropic absorption (i.e. the absorption of light varies depending on the polarization direction). In the present system, the absorption is higher along the long axis of the molecule and such dyes may be referred to as "positive dyes" or dyes exhibiting positive dichroism. Positive DC dyes are generally used herein. In some embodiments, a DC dye (as measured in a LC host) may have a dichroic ratio of at least 5.0, alternatively at least 6, 7, 8, 9, 10, 11, 12, 13, 14, 15, 16, 17, 18, 19 or 20.

The level of visible light absorption by the DC dye may be a function of the dye type and the LC host. In the optical devices of the present disclosure, the apparent absorption of visible light may also be a function of voltage. The orientation or long-range order of the LC may be a function of electric field or voltage across the cell thickness. A DC dye exhibits some alignment with the LC host so that application of a voltage may be used to alter the apparent darkness of the cell.

In some embodiments, a DC dye may include a small molecule type of material. In some embodiments, a DC dye may include an oligomeric or polymeric material. It is also possible to add a polymeric component to the dye mixture. The chemical moiety responsible for light absorption may, for example, be a pendent group on a main chain. Multiple DC dyes may optionally be used, for example, to tune the light absorption envelope or to improve overall cell performance with respect to lifetime or some other property. DC dyes may include functional groups that may improve solubility, miscibility with or bonding to the LC host. Some non-limiting examples of DC dyes may include azo dyes, for example, azo dyes having 2 to 10 azo groups, or alternatively, 2 to 6 azo groups. Other DC dyes are known in the art, such as anthraquinone, perylene, triphenodioxazine, quinophthalone, and BODIPY (boron-dipyrromethene) dyes. Generally, any molecule with dichroic properties can be used. For some applications, DC dyes having an absorption band FWHM of 175 nm, or less are preferred. Alternatively, the DC dyes may have a FWHM absorption of less than 150 nm, 125 nm, 100 nm, 90 nm, 80 nm, 70 nm, 60 nm, 50 nm, 40 nm, 30 nm, 20 nm or 10 nm, It should be noted that one or more DC dyes can be used in a Narrow Band Mixture, i.e., a guest-host liquid crystal mixture that can be used in a narrow band cell to produce a narrow band absorption.

Other Cell Features

Substrate

Referring again to FIG. 1, in some embodiments, the substrate 12a, 12b, 32a, 32b may be independently selected and may include a plastic, a glass, a ceramic, or some other material. Choice of material and its particular properties depends in part on the intended application. For many applications, the substrate should be at least partially transmissive to visible light. In some embodiments, a substrate may have higher than 45% transmission to visible radiation having a wavelength between 400 nm and 700 nm, alternatively, higher than 50%, 60%, 70%, 80%, 90%, or 95% transmission. In some embodiments, the substrate may have high optical clarity so that a person or sensor may clearly see through the LP-VTOD 10. In some embodiments, the substrate may optionally have some color or tint. In some embodiments, the substrate may have an optical coating on the outside of the cell. A substrate may be flexible or rigid.

As some non-limiting examples, a plastic substrate may include a polycarbonate (PC), a polycarbonate and copolymer blend, a polyethersulfone (PES), a polyethylene terephthalate (PET), cellulose triacetate (TAC), a polyamide, p-nitrophenyl butyrate (PNB), a polyetheretherketone (PEEK), a polyethylene naphthalate (PEN), a polyetherimide (PEI), polyarylate (PAR), a polyvinyl acetate, a cyclic olefin polymer (COP) or other similar plastics known in the art. In some non-limiting examples, flexible glass including materials such as Corning® Willow® Glass and the like can be used as a substrate. A substrate may include multiple materials or have a multi-layer structure.

In some embodiments, the thickness of a substrate may be in a range of 10-20 μm, 20-30 μm, 30-40 μm, 40-50 μm, 50-75 μm, 75-100 μm, 100-150 μm, 150-200 μm, 200-250 μm, 250-300 μm, 300-350 μm, 350-400 μm, 400-450 μm, 450-500 μm, 500-600 μm, 600-800 μm, 800-1000 μm, or greater than 1 mm or any combination of ranges thereof.

In some embodiments, the LP-VTOD 10 does not use polarizers.

Transparent Conducting Layer

By "transparent" conducting layer, it is meant that the conducting layer 14a, 14b, 34a, 34b allows at least 45% of incident visible light to pass through. A transparent conducting layer may absorb or reflect a portion of visible light and still be useful. In some embodiments, the transparent conducting layer may include a transparent conducting oxide (TCO) including, but not limited to, ITO, AZO, or FTO. In some embodiments, the transparent conducting layer may include a conductive polymer including, but not limited to, PEDOT:PSS, a poly(pyrrole), a polyaniline, a polyphenylene, or a poly(acetylene). In some embodiments, the transparent conducting layer may include a partially transparent thin layer of metal or metal nanowires, e.g., formed of silver, copper, aluminum, or gold. In some embodiments, the transparent conducting layer may include graphene.

Narrowband Light Source

In some embodiments, narrowband radiation may have a wavelength bandwidth less than 88 nm, alternatively less than, 80, 70, 60, 50, 40, 30, 20, 15, 10, 9, 8, 7, 6, 5, 4, 3, 2 mn, or a bandwidth equal to 1 nm. In some cases, bandwidth may correspond to a full-width-at-half-max (FWHM) of a spectrum of relative radiant power vs. wavelength. In some embodiments, the narrowband radiation may be ultra-narrowband radiation such as a coherent laser light, e.g., originating from one or more pulsed or continuous wave lasers. In some cases, narrowband radiation may be non-coherent and originate from one or more laser diodes, LEDs, micro-LEDs, superluminescent diodes (SLDs), surface-mounted diodes (SMDs), or laser- or LED-pumped phosphor devices. Alternatively, narrowband radiation may originate from xenon, mercury, or other high intensity lamp whose light output is sent through a color filter element and optionally through collimating lenses. In some embodiments, the narrowband radiation may originate from a GaN-, GaAs-, or InP-based laser or diode.

In general, the peak narrowband radiation wavelength can be within any region of the electromagnetic spectrum from 100 nm to 1 mm. In some embodiments, at least one peak narrowband radiation wavelength is in the visible spectrum, i.e., a range of 380 nm to 780 nm, or alternatively, 400 nm to 700 nm. In some cases, at least one narrowband radiation wavelength is in a range of greater than 400 nm up to and including 500 nm, greater than 500 nm up to and including 600 nm, or greater than 600 nm up to and including 700 nm. In other embodiments, at least one peak narrowband radiation wavelength is in the infra-red (IR) or ultraviolet (UV) region. IR wavelengths include near-IR (700 nm to 1,300 nm), mid-IR (1,300 nm to 3,000 nm), or far-IR (3,000 nm to 1 mm) radiation. UV wavelengths include peak radiation wavelength within 100-380 nm, or alternatively, 100-400 nm.

When there are multiple sources of narrowband radiation, the second (or additional) peak narrowband radiation wavelength may be in visible range, the UV or the IR range, as described above. In some cases, the second (or additional) peak narrowband radiation wavelength may be in a range of greater than 100 nm, 200 nm, or 240 nm up to and including 380 nm, greater than 780 nm up to and including 1,300 nm, or greater than 1,300 up to and including 3,000 nm, greater than 3,000 nm up to and including 1 mm, or any rage therebetween. In some embodiments, the narrowband radiation is laser light having a peak intensity wavelength of about 257 nm, 266 nm, 343 nm, 355 nm, 405 nm, 450 nm, 473 nm, 473 nm, 488 nm, 515 nm, 520 nm, 532 nm, 589 nm, 593 nm, 635 nm, 638 nm, 650 nm, 660 nm, 670 nm, 694 nm, 914 nm, 1030 nm, 1047 nm, 1064 nm, 1319 nm, 1342 nm, 1444 nm, 1645 nm, 2000 nm, 2100 nm, 2940 nm, or some other wavelength.

LP-VTOD Embodiments and Properties

Below is a description of how some of the device embodiments function to improve visibility while protecting against narrow-band intense light sources, such as lasers. In contrast to a static film for laser protection, the described device has the advantage of (a) being only absorptive when needed, so it reduces impairment of a user's vision or color perception at other times when not needed, and (b) the narrow absorption band is designed to only absorb the wavelength of light necessary for protection, thereby increasing the photopic transmission of the system as a whole.

FIGS. 3A-3E are a series of cross-sectional schematics of a non-limiting example of an LP-VTOD according to some embodiments. LP-VTOD 310 includes a first cell 311 having a first guest-host mixture including a negative first LC host 322 and a first dye composition 324 that may include at least one positive DC dye. The host and dye molecules are drawn to illustrate a general orientation. The first cell is in optical communication with a second cell having a second guest-host mixture including a negative second LC host 342 and a second dye composition 344 that may include at least one positive DC dye that is different than the first DC dye composition 324. For clarity, other components of cells 311, 331 are not shown, but may optionally be as described with respect to FIG. 1 and variations thereof. In some embodiments, each cell can be independently controlled by power circuits $V_1$ and $V_2$ provided in controller 355.

Figure 3A:
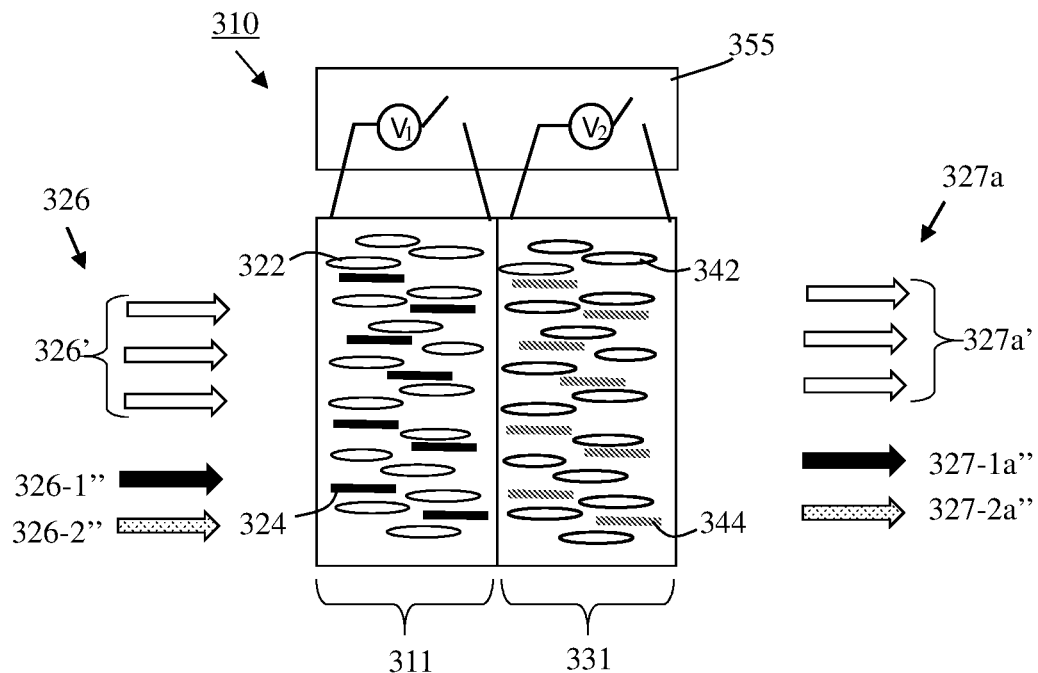
FIGS. 3A-3D are series of cross-sectional schematics of a non-limiting example of a LP-VTOD according to some embodiments.

In this embodiment, the first cell absorbs light in a first wavelength region and the second cell absorbs light in a second wavelength region that is different from the first wavelength region. In FIG. 3A, both power circuits $V_1$ and $V_2$ are open with no voltage applied across either cell 311, 331. The first and second cells are both in a state of higher light transmission (which may be at or near their maximum light transmission state) and the LP-VTOD 310 is in a clear state which may be at or near its most light transmissive state where a substantial amount of incident light 326 passes through as transmitted light 327a. Incident light 326 may include broadband light 326' that may correspond to light from the general environment, e.g., a room, the outdoors, or the like, typically made up of a variety of wavelengths across some or all of the visible spectrum.

The incident light 326 may further include a first narrowband radiation 326-1" having a peak intensity at a first peak narrowband radiation wavelength, and in some cases, the incident light may also include a second narrowband radiation 326-2" having a peak intensity at a second peak narrowband radiation wavelength different from the first narrowband radiation wavelength, e.g., by at least 5 nm or by at least 5%. The first and second narrowband radiation may be from a laser or other narrowband light source described above and may have a higher intensity than broadband light 326', e.g., sufficient to disrupt or even damage a person's vision or the function of a sensor such as a camera sensor.

The VTOD can be configured so that each cell has a different transmittance at the peak absorbance wavelength as compared to the overall (photopic) absorbance of the system as a whole. For example. in some embodiments, the clear state of at least one cell may have a clear state photopic transmission, $PT_{CS}$, of at least 40% (alternatively, at least 50%, 60%, 70%, 80%, 90%, or 95%. In some cases, the device may be characterized by a clear state transmittance at a peak absorbance wavelength (% $T_{CS-P}$) for at least one cell that is 1-5%, or alternatively, at least 10%, 20%, 30%, 40%, 50%, 60%, 70%, 80%, or 90%. % $T_{CS-P}$ may refer to the first peak absorbance wavelength (% $T_{CS-P1}$) or to the second peak absorbance wavelength (% $T_{CS-P2}$).

Figure 3B:
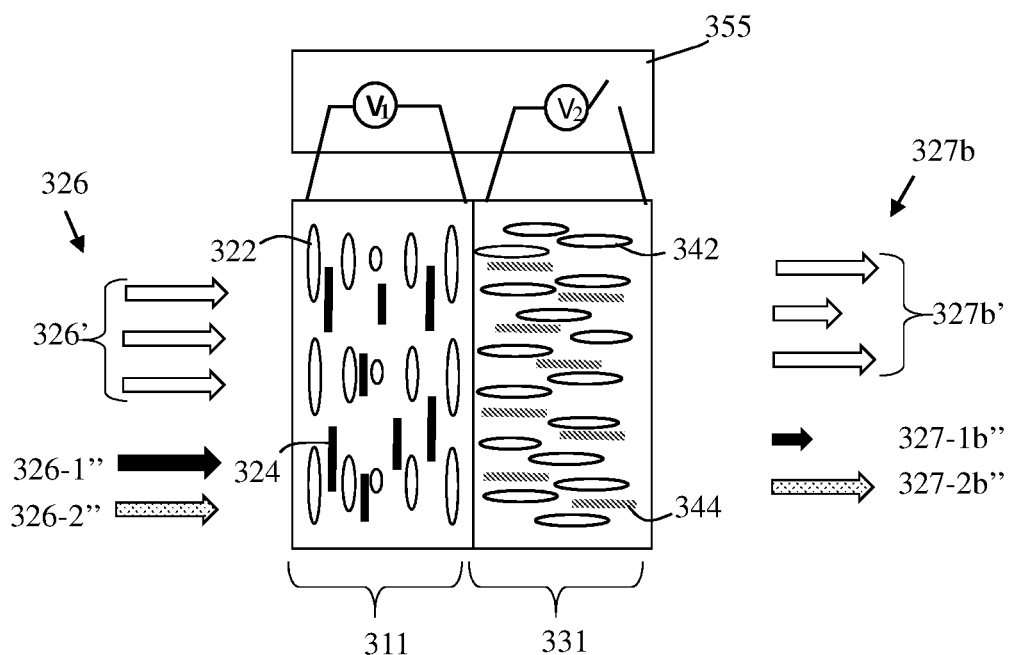

In FIG. 3B, the second cell's power circuit $V_2$ remains open with no voltage applied, but the first cell's power circuit $V_1$ is closed, and a voltage is applied above a threshold voltage sufficient to significantly reorient the LC host 322 and DC dye composition 324. Light absorption in a first wavelength region increases as the voltage is increased. Light transmission can be varied based on applied voltage up to a point, beyond which, increasing the voltage has less effect. In FIG. 3B, the LP-VTOD is in a first tinted state (which may also be referred to herein as a first darkened state) where the first cell 311 is in a state of lower light transmittance (optionally at or near its minimal light transmission state) in a first wavelength region such that some amount of incident visible light 326 in the first wavelength region is absorbed resulting in transmitted light 327b. In particular, the first cell blocks a substantial amount of narrowband radiation 326-1" which passes as 327-1b" at a much-reduced intensity. Activating the first cell may also block some of the broadband radiation 326', but because the first cell has a narrow band absorption, much of 326' passes through as transmitted broadband radiation 327b' so that the user or sensor can still adequately view the scene or environment without substantial distortion. Blocking the narrowband radiation while still preserving acceptable viewing conditions of the scene or environment provides additional safety to the user, especially those in a hazardous situation, operating a vehicle or aircraft, or the like. For example, the user or a sensor may detect narrowband radiation 326-1", e.g., intense 532 nm laser light, and activate the cell (manually or automatically).

Figure 3C:
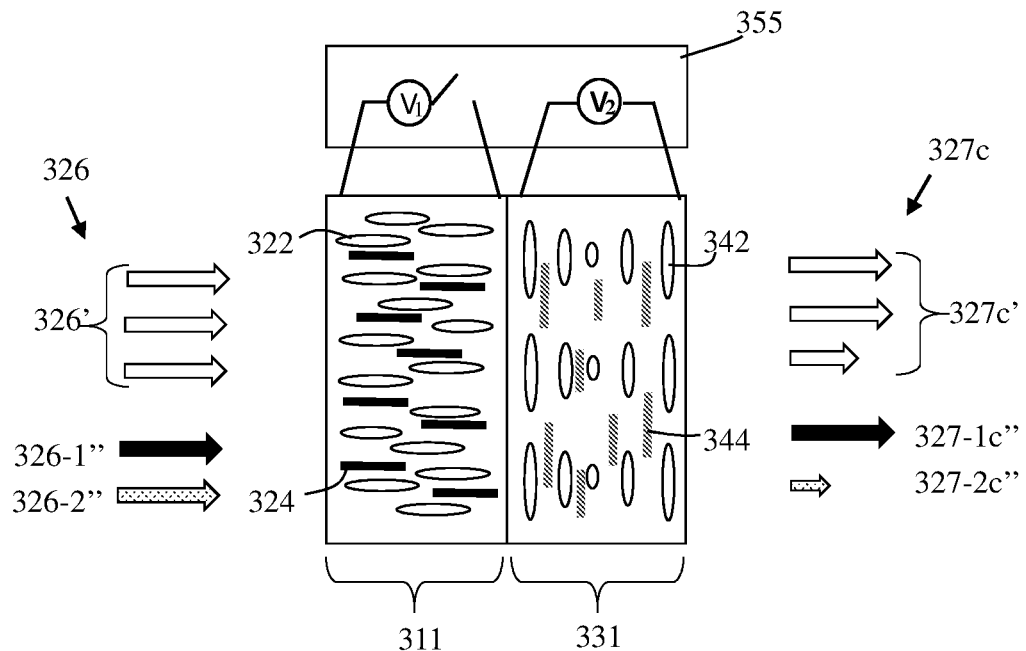

In FIG. 3C, the first cell's power circuit $V_1$ is open with no voltage applied, but the second cell's power circuit $V_2$ is closed, and a voltage is applied above a threshold voltage sufficient to significantly reorient the LC host 342 and DC dye composition 344. Light absorption in a second wavelength region increases as the voltage is increased. Light transmission can be varied based on applied voltage up to a point, beyond which, increasing the voltage has less effect. In FIG. 3C, the LP-VTOD is in a second tinted state (which may also be referred to herein as a second darkened state) where the second cell is in a state of lower light transmittance (optionally at or near its minimal light transmission state) in a second wavelength region such that some amount of incident visible light 326 in the second wavelength region is absorbed resulting in transmitted light 327c. In particular, the second cell blocks a substantial amount of narrowband radiation 326-2" which passes as 327-2c" at a much-reduced intensity. Activating the second cell may also block some of the broadband radiation 326', but because the second cell has a narrow band absorption, much of 326' passes through as transmitted broadband radiation 327c' so that the user or sensor can still adequately view the scene or environment without substantial distortion. Blocking the narrowband radiation while still preserving acceptable viewing conditions of the scene or environment provides additional safety to the user, especially those in a hazardous situation, operating a vehicle or aircraft, or the like. For example, the user or a sensor may detect narrowband radiation 326-2", e.g., intense 635 nm laser light, and the cell activate (manually or automatically).

Figure 3D:
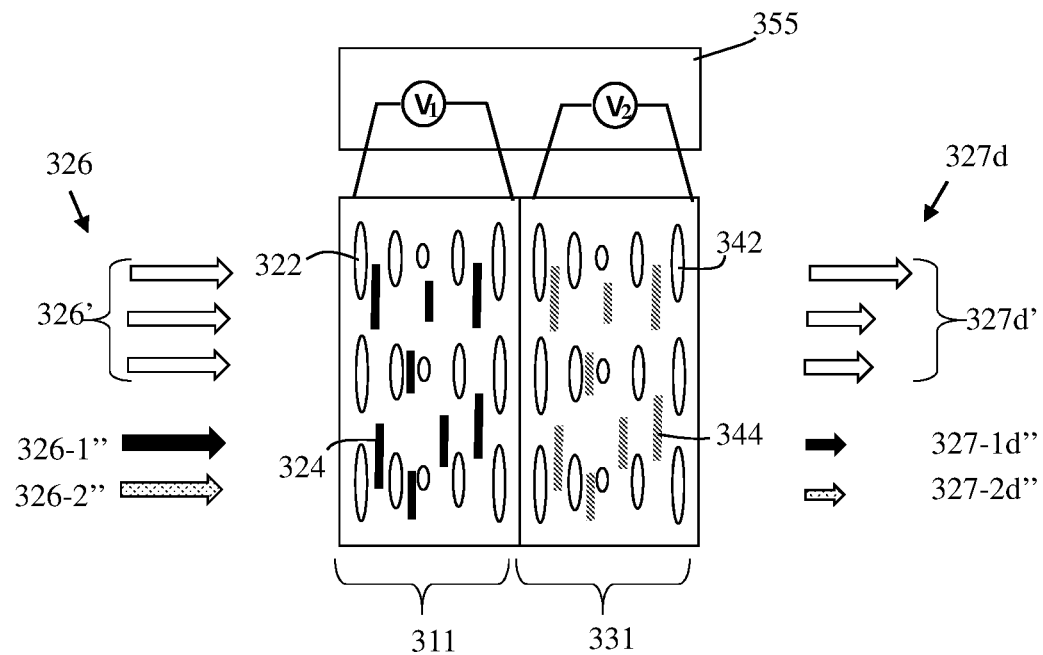

In FIG. 3D, both the first and second cell's power circuits $V_1$ and $V_2$ are closed and voltage is applied (above a threshold voltage) to both cells such that each cell may operate as generally described with respect to FIGS. 3B and 3C, respectively, such that incident light 326 passes through as transmitted light 327d. Here, both of the first narrowband radiation 326-1" and second narrowband radiation 326-2" are substantially blocked which passes as 327-1d" and 327-2d", each having much-reduced intensity. Again, while there may be some reduction or filtering of broadband radiation 326', much of it advantageously passes through as transmitted broadband radiation 327d' so that the user or sensor can still adequately view the scene or environment without substantial distortion, as previously explained.

When a cell is activated to its state of lower transmittance, the LP-VTOD may be characterized by darkened state having a transmittance at the corresponding peak absorbance wavelength (% $T_{DS-P}$) that is generally no more than 10%, alternatively no more than 5%, 3%, 2%, 1%, 0.5%, 0.2%, 0.1%, 0.05%, 0.02%, 0.01%, or even lower. In some cases, a ratio of % $T_{DS-P}$/% $T_{CS-P}$ may be no more than 0.5, alternatively no more than 0.4, 0.3, 0.2, 0.1, 0.05, or 0.02. Note that the values and metrics relating to % $T_{DS-P}$ may refer to the first peak absorbance wavelength (% $T_{DS-P1}$) when the first cell is activated, or to the second peak absorbance wavelength (% $T_{DS-P2}$) when the second cell is activated, or combined when both cells are activated.

When a cell is activated to its state of lower transmittance, the LP-VTOD may in some cases be characterized by darkened state having an optical density (O.D.) at the corresponding peak absorbance wavelength that may be at least 1.0, preferably at least 1.5, more preferably at least 2.0, 2.5, 3.0, 3.5, 4.0 or even higher. In some embodiments, the change between the clear state transmittance (% $T_{CS-P}$) and the dark state transmittance (% $T_{DS-P}$) at the peak absorbance wavelength may correspond to an optical density difference (ΔOD) that is greater than 0.5 OD, 0.75 OD, 1 OD, or in some examples, greater than 1.5, 2, 2.5, 3, 3.5, or 4 OD.

In some cases, the darkened state of the LP-VTOD may be characterized by a photopic transmission $PT_{DS}$ of at least 10%, alternatively, at least 20%, 30%, 40%, 45%, 50%, 55%, or 60%. In some cases, the $PT_{CS}$ is greater than the $PT_{DS}$ by more than 20 percentage units, alternatively 25 percentage units, 30 percentage units, 35 percentage units, or 40 percentage units. In some embodiments, a ratio of $PT_{DS}/PT_{CS}$ is at least 0.25, alternatively, 0.3, 0.4, 0.5, 0.6 or 0.7. Note that the aforementioned metrics involving $PT_{DS}$ may refer to when just the first cell is in a state of lower transmittance (FIG. 3B), when just the second cell is in a state of lower transmittance (FIG. 3C), or when both the first and second cells are in a state of lower transmittance (FIG. 3D).

The particular dye composition can be chosen based in part on what narrowband radiation wavelengths are desired for blocking. In general, the highest blocking will occur when the peak absorbance wavelength is near the narrow band radiation peak intensity wavelength, e.g., within 40 nm, preferably within 30 nm, 20 nm, 15 nm, or more preferably within 10 nm. In some embodiments, at the narrowband radiation wavelength (which may optionally be ultra-narrowband radiation), the LP-VTOD may able to provide an optical density of at least 1.0, preferably at least 1.5, more preferably at least 2.0, 2.5, 3.0, or even higher.

It should be noted that depending on whether the LC host has negative anisotropy, the system will be absorptive ("dark" state) upon application of a voltage, and clear when no voltage is applied. Conversely, when an LC host with positive anisotropy is used, the system will be dark when no voltage is applied, and transition to clear upon application of a voltage. The examples and descriptions provided cover the device that uses a negative LC, but each system or device can also be configured to use a positive LC host (i.e. an LC having positive dielectric anisotropy).

Figure 4A:
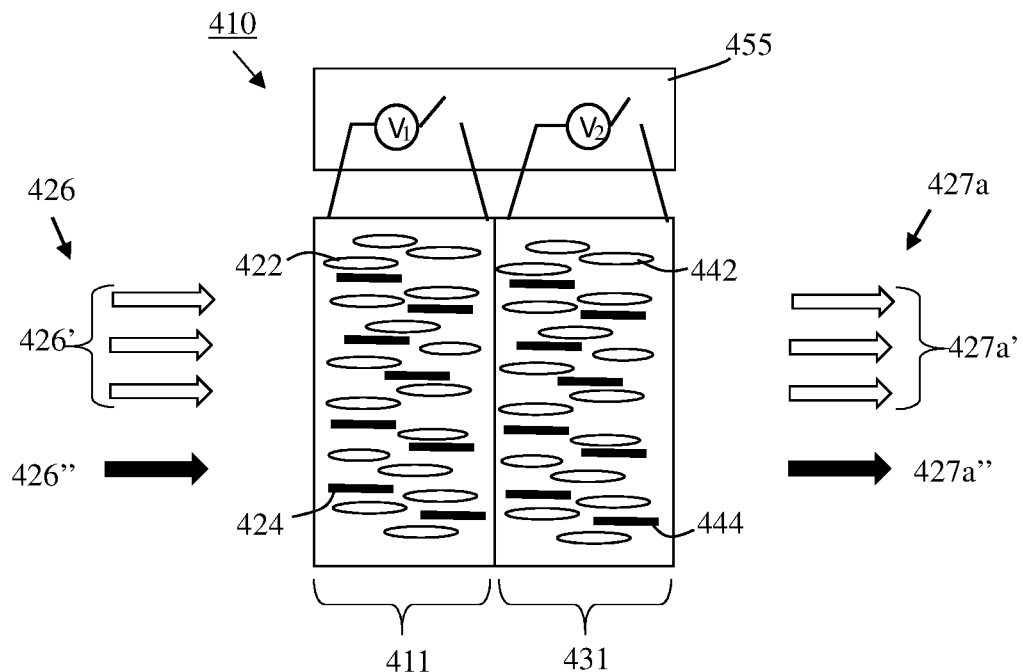
FIGS. 4A-4B are cross-sectional schematics of a non-liming example of another LP-VTOD according to some embodiments.
Figure 4B:
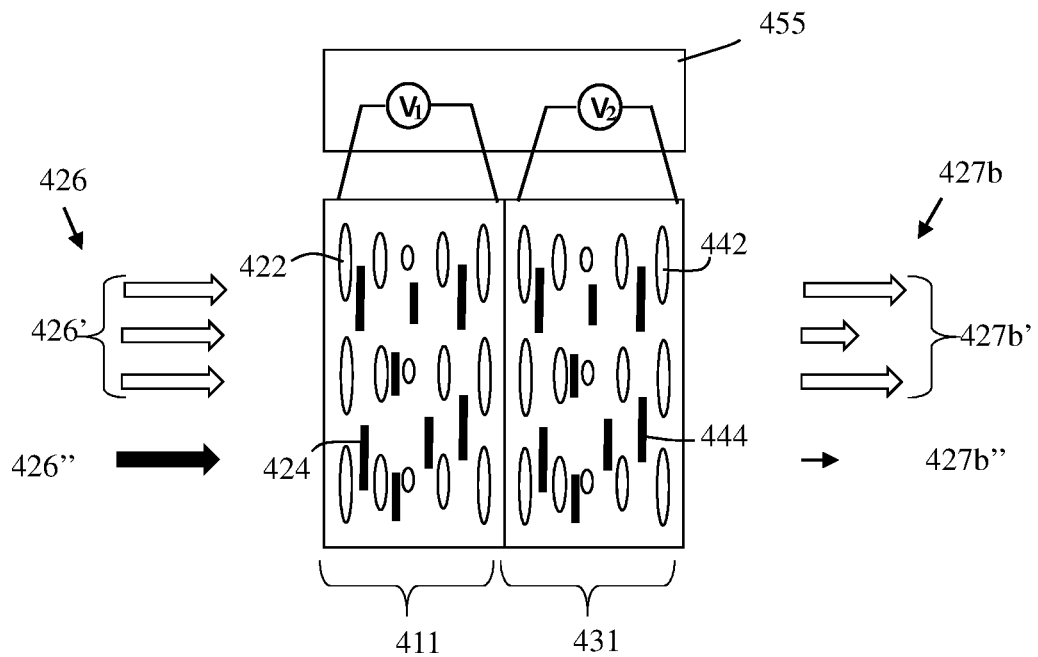

FIGS. 4A-4B are cross-sectional schematics of a non-liming example of a LP-VTOD according to some embodiments. In this embodiment, both cells are formulated to provide narrow band absorbance. LP-VTOD 410 includes a first cell 411 having a first guest-host mixture including a negative first LC host 422 and a first dyestuff material that includes a positive first DC dye composition 424. The host and dye molecules are drawn to illustrate a general orientation. The first cell is in optical communication with a second cell having a second guest-host mixture including a negative second LC host 442 and a second dyestuff material that includes a positive second DC dye composition 444 or dye mixture. In some cases, the hosts and/or dye compositions of the first and second cells may be substantially the same. For clarity, other components of cells 411, 431 are not shown, but may optionally be as described with respect to FIG. 1 and variations thereof. In some embodiments, each cell can be independently controlled by power circuits $V_1$ and $V_2$ provided in controller 455. In other embodiments, the application of a voltage across the first and second cells may be commonly controlled.

In this embodiment, the first and second narrow band cells both absorb light with a peak wavelength within a visible region, a UV region or an IR region of the spectrum. In some embodiments, the first and second cells absorb light in a first and second wavelength regions, respectively, where the second wavelength region is substantially the same as the first wavelength region. Wavelength regions that are absorbed substantially the same by the first and second cells may be those that, when darkened to the same photopic transmission, have spectra characterized by a % T for each wavelength that is within 10% units of each other, alternatively within 5% units, within the relevant wavelength region. For example, where the wavelength region is visible light, a wavelength range of at least 450-650 nm, alternatively 400-700 nm, alternatively 380-780 nm. In some cases, wavelength regions that are substantially the same may include when the first peak absorbance wavelength is within 5% of the second peak absorbance wavelength, or the first FWHM is within 5% of the second FWHM, or both. Alternatively, wavelength regions that are substantially the same may include when the first peak absorbance wavelength is within 5 nm of the second peak absorbance wavelength, or the first FWHM is within 5 nm of the second FWHM, or both.

In some embodiments, wavelength regions that are substantially the same may produce CIE 1931 x-y chromaticities (in the cells darkened state) within 0.07 units (x and y) for each cell.

CIE 1931 x-y chromaticity or XYZ color space refers to the colorimetric standard created by the International Commission on Illumination (CIE). In FIG. 4A, both power circuits $V_1$ and $V_2$ are open with no voltage applied across either cell 411, 431. The first and second cells are both in a state of higher light transmission (which may be at or near their maximum light transmission state) and the LP-VTOD 410 is in a clear state which may be at or near its most light transmissive state where a substantial amount of incident visible light 426 passes through as transmitted light 427a. Incident light 426 may include broadband light 426' that may correspond to light from the general environment, e.g., a room, the outdoors, or the like, typically made up of a variety of wavelengths across some or all of the visible spectrum.

The incident light 426 may further include a narrowband radiation 426" having a peak intensity at a first peak narrowband radiation wavelength. The narrowband radiation may be from a laser or other narrowband light source and may have a higher intensity than broadband light 426', e.g., sufficient to disrupt or even damage a person's vision or the function of a sensor such as a camera sensor.

In FIG. 4B, both the first and second cell's power circuits $V_1$ and $V_2$ are closed (under independent or commonly control) and a voltage is applied above a threshold voltage for both cells sufficient to significantly reorient LC host 422, 442 and DC dye composition 424, 444. Light absorption in the first and second wavelength regions (which may be the same) increase as the voltage is increased. Light transmission can be varied based on applied voltage up to a point, beyond which, increasing the voltage has less effect. In FIG. 4B, the LP-VTOD is in a darkened state where both the first and second cells 411, 431 are in a state of lower light transmittance (optionally at or near their minimal light transmission state) in a first/second wavelength region such that some amount of incident visible light 426 in the first/second wavelength region is absorbed resulting in transmitted light 427b. In particular, the first and second cells together block a substantial amount of narrowband radiation 426" which passes as 427b" at a greatly reduced intensity. Activating the first and second cells may also block some of the broadband radiation 426', but because the cells have narrow band absorption, much of 426' passes through as 427b' so that the user or sensor can still adequately view the scene or environment without substantial distortion. Blocking the narrowband radiation while still preserving acceptable viewing conditions of the scene or environment provides additional safety to the user, especially those in a hazardous situation, operating a vehicle or aircraft, or the like. For example, the user or a sensor may detect narrowband radiation 426", e.g., intense 532 nm laser light, and activate the cells (manually or automatically).

Figure 4C:
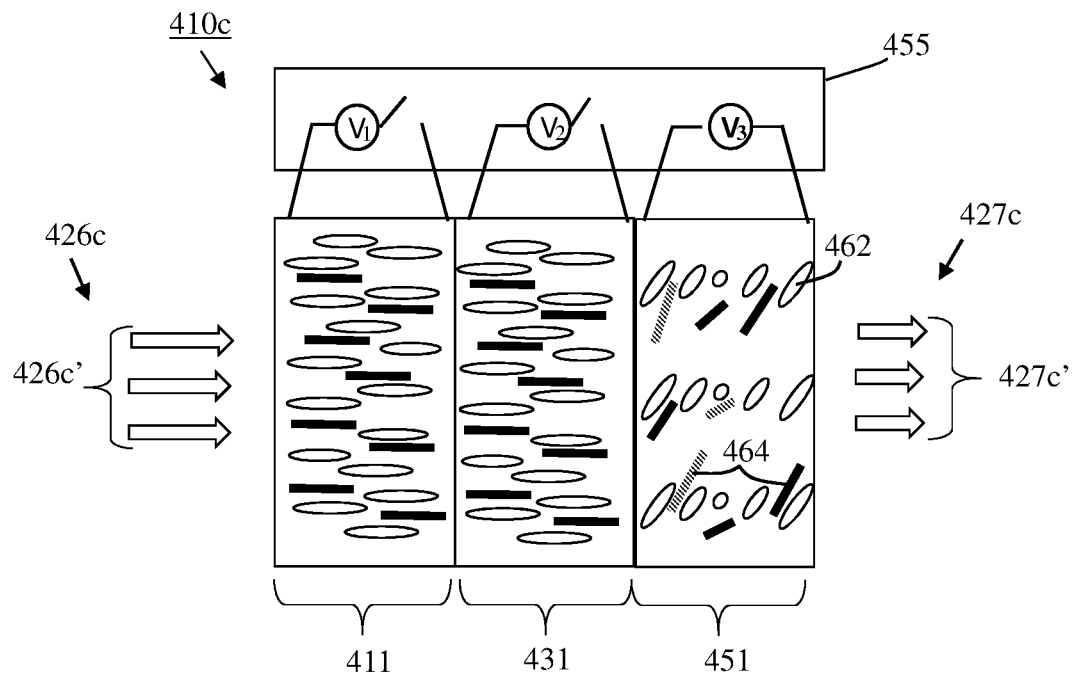
FIGS. 4C-4D are cross-sectional schematics of a non-liming example of another LP-VTOD according to some embodiments.
Figure 4D:
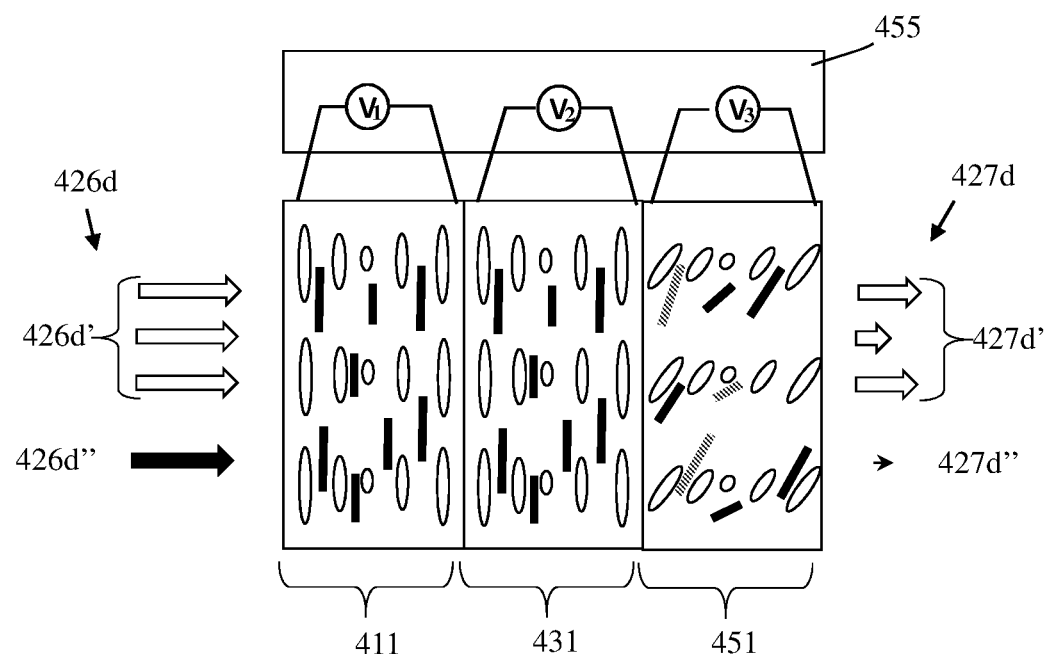

FIGS. 4C and 4D are cross-sectional schematics of a LP-VTOD 410c similar to those of FIGS. 4A and 4B, but including a third cell 451. Third cell 451 may in some embodiments include a wide band electro-optic material, e.g., having a third guest-host mixture including a negative third LC host 462 and a third dye composition 464 that may include two or more different positive DC dyes. The host and dye molecules are drawn to illustrate a general orientation. The third cell is in optical communication with the first and second cells. In some embodiments, the third cell can be, relative to the first and second cells, independently controlled by power circuit $V_3$ in controller 455. As shown in FIG. 4C, power circuit $V_3$ is closed, and a voltage is applied above a threshold voltage sufficient to significantly reorient the LC host 462 and DC dye composition 464. Light absorption in a first wavelength region increases as the voltage is increased. Light transmission can be varied based on applied voltage up to a point, beyond which, increasing the voltage has less effect. In FIG. 4C, the third cell 451 is depicted in an intermediate darkened state. For example, third cell 451 may correspond to electronic sunglasses that reduce transmission across much or all of the visible spectrum.

Referring to FIG. 4C, power circuits $V_1$ and $V_2$ are open with no voltage applied across either cell 411, 431. The first and second cells are both in a state of higher light transmission (which may be at or near their maximum light transmission state) while the third cell 451 is in an intermediate darkened state. A substantial amount of incident light 426 incident on LP-VTOD 410c passes through the first and second cells, but is partially absorbed by the third cell to produce transmitted light 427c. Incident light 426 may include broadband light 426' that may correspond to light from the general environment, e.g., a room, the outdoors, or the like, typically made up of a variety of wavelengths across some or all of the visible spectrum, that is partially absorbed and transmitted as 427c'. In some cases, the third cell may be colorimetrically neutral in its light absorption and not impart a significant tint to transmitted light 427c' relative to 426c. A colorimetrically neutral state may be characterized as having both neutrality and low color chromaticity.

Referring to FIG. 4D, during operation, a sensor or a user may detect narrowband radiation 426d'' e.g., intense 532 nm laser light, and activate (manually or automatically) the first and second cells, 411 and 431, to place them in their states of lower transmittance as described elsewhere. This can substantially reduce the intensity of transmitted narrowband radiation 427d''. While there may be some additional reduction or filtering of broadband radiation 426' (beyond the intentional dimming caused by cell 451), transmitted broadband radiation 427d' is sufficient so that the user or sensor can still adequately view the scene or environment without substantial distortion, as previously explained. In some embodiments, detecting the narrowband radiation may further cause the wide band cell 451 to change applied voltage $V_3$ so that it may further darken or alternatively become less dark.

Figure 5:
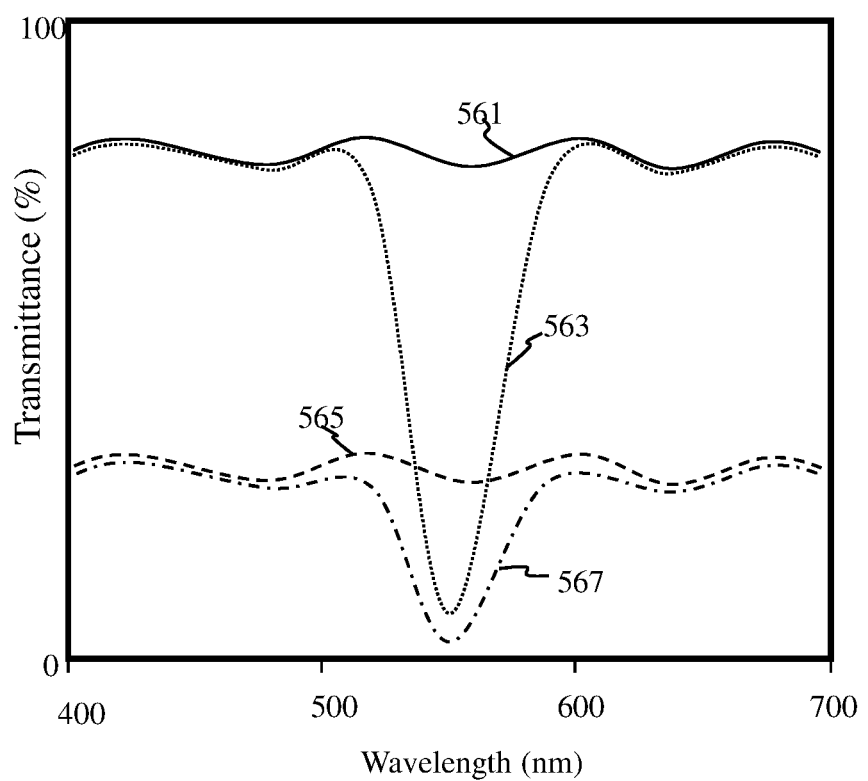
FIG. 5 is a graph of various light transmittance spectra illustrating the effect of adding a wide band cell to the LP-VTOD according to some embodiments.

To further illustrate how wide band and narrow band cells may be used together, FIG. 5 shows a set of light transmittance spectra according to some embodiments. Transmittance spectrum 561 may correspond to a clear state of LP-VTOD 410c where all three cells (411, 431, and 451) are in their state of higher transmittance. In some cases, transmittance spectrum 561 may optionally be colorimetrically neutral or have low color chromaticity as shown here. Transmittance spectrum 563 may correspond to activating the first and second narrow band cells (411, 431) to put them a state of lower transmittance, while third wide band cell 451 remains in a state of higher transmittance. This state may be used, e.g., to absorb a specific laser light (such as green, as illustrated here, or some other laser light). Transmittance spectrum 565 corresponds to a darkened state produced by the third wide band cell 451 as previously described. This darkened state may optionally be colorimetrically neutral (or low color chromaticity) first or second darkened state or even a colorimetrically neutral or have low color chromaticity. Transmittance spectrum 565 may, for example, be produced when the LP-VTOD is as shown in FIG. 4C. Transmittance spectrum 567 corresponds to a dark tinted state where all three cells are in a state of lower transmittance. The dark tinted state may be used to protect against laser light while also providing the user with reduced overall light transmittance in wavelength regions other than the laser wavelength.

Figure 6:
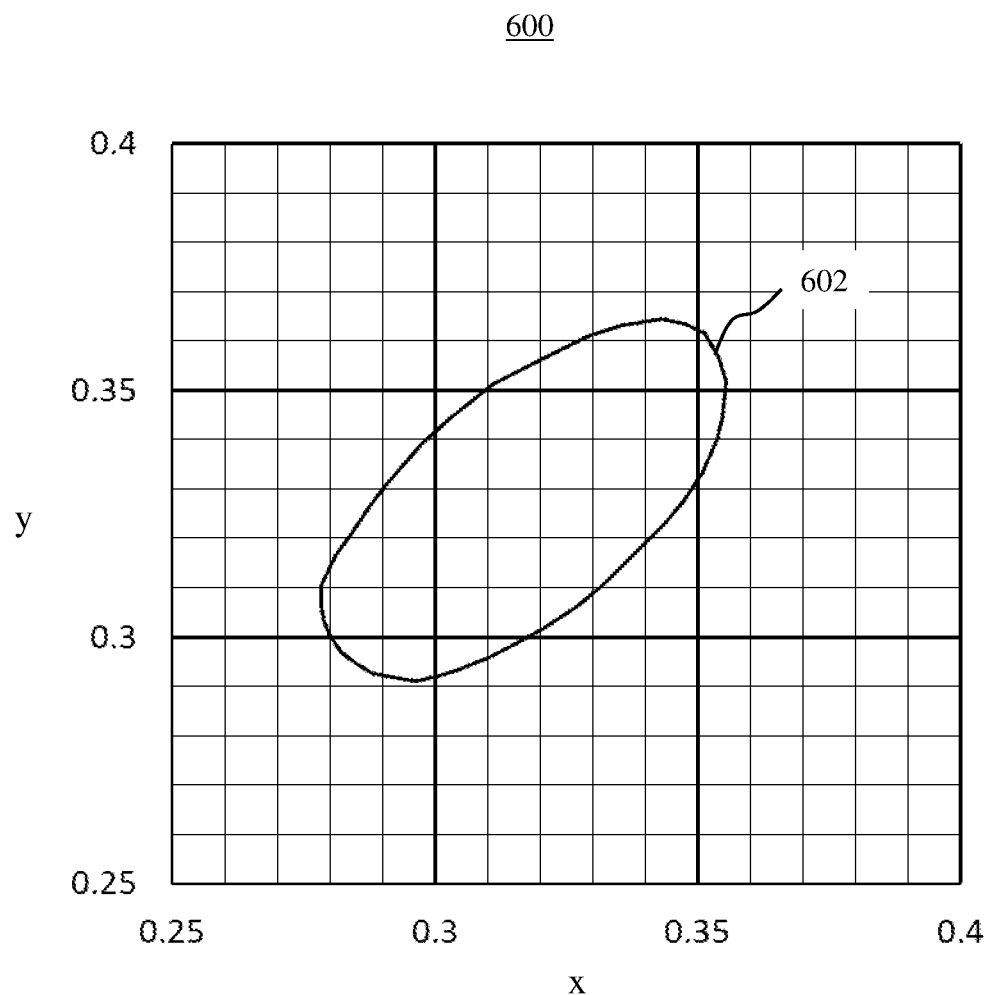
FIG. 6 illustrates a portion of the CIE 1931 x-y color space chromaticity diagram according to some embodiments.

Turning to FIG. 6, in some embodiments, when incident light 426c (or broadband radiation 426c') is Illuminant C light, the transmitted light 427c may have a chromaticity that falls with neutral region 602 of CIE 1931 x-y chromaticity diagram 600. In the Munsell color system, neutral region 602 corresponds to the equal chroma 2 loci at a Munsell value of 5 (neutral region 602 may be referred to herein simply as chroma 2 at Munsell value 5). In the Munsell color system, a Munsell "value 5" is associated, under Illuminant C, to "the luminous reflectance Y equivalent (percent form)" of about 20%. It is further noted that neutral region 602 is also similar to that used in some military specifications for light-darkening goggles (e.g., see FIG. 1 of MIL-PRF-32432A, published Sep. 11, 2018, the entire contents of which is incorporated by reference herein for all purposes).

Although not shown, rather than using just a single cell 451 for dimming broadband radiation, two or more cells may be used, e.g., as described in U.S. Non-Provisional patent application Ser. No. 18/369,843, which has been incorporated herein by reference.

In some cases, to detect narrowband radiation incident on or near the LP-VTOD, a sensor may be added to the LP-VTOD itself or to a frame or housing that may support the cells or may be provided in some other location. For example, if the LP-VTOD is being used by a pilot, the aircraft or the windshield may house the sensor. The sensor may be provided on any vehicle or even a piece of clothing or equipment operated by the LP-VTOD user. The sensor may be in wired or wireless communication with the LP-VTOD controller. The sensor may be a light sensor. Alternatively, the sensor may detect a secondary electromagnetic signature indicative of laser usage in the vicinity.

In some embodiments, the LP-VTOD may include or be interfaced with an additional variable transmission optical device. For example, the LP-VTOD may include an additional cell that is a wide band VTOD, a narrow band VTOD, photochromic device, an electrochromic device, or a hybrid VTOD that may include PC dyes and/or PCDC dyes.

In some embodiments, one cell of the LP-VTOD may include a LC host having right-handed chirality and the other cell of the LP-VTOD may include a LC host having left-handed chirality. In some embodiments, the light absorbance curves of the two cells may have significant overlap. By changing the handedness of the LC, the polarization dependence in the overlap region (although generally small in the present guest-host systems) may be further reduced which can result in a beneficial transmission swing increase. This effect may be strongest where the overlap is in the green region of the visible spectrum where the human eye has highest sensitivity, e.g., in first/second cell combinations of blue/yellow-orange and red/cyan.

The chirality of the host material results in an intrinsic pitch, p, of the liquid crystal host material. The ratio of the cell gap thickness, d, to this pitch is referred to as d/p. In some embodiments, the liquid crystal host may have d/p equal to 0. In some embodiments, the liquid crystal host may have a d/p greater than 0. In some embodiments having low d/p and birefringence, referred to as "In the Mauguin limit", the polarization of the light follows that of the liquid crystal. Alternatively, devices that are not In the Mauguin limit, light propagation eigenmode are elliptical. In some cases, the host liquid crystal may make the device less polarization sensitive, i.e., less than 90%, 80%, 70%, 60%, 50%, 40%, 30%, 20% or 10% polarization sensitive.

In some embodiments, the cells of the LP-VTOD may have a thickness to pitch ratio (d/p) of at least 0.01, alternatively at least 0.1, 0.2, 0.3, 0.4, or 0.5. In some embodiments, d/p is less than or equal to 3.0, or alternatively less than or equal to 2 or 1. In some embodiments, d/p may be in a range of 0.01-0.2, 0.2-0.3, 0.3-0.4, 0.4-0.5, 0.5-0.6, 0.6-0.7, 0.7-0.8, 0.8-0.9, 0.9-1.0, 1.0-1.5, 1.5-2.0, 2.0-2.5, 2.5-3.0, or any combination of ranges thereof.

In some embodiments, the LP-VTOD may use plastic substrates that have an optical retardation with less than ±20% variation in uniformity across the area of the device, alternatively less than ±15%, or less than ±10%.

In some embodiments, the cells of the LP-VTOD may have an individually selected cell gap in a range of 3 to 5 microns, 5 to 7 microns, 7 to 10 microns, 10 to 15 microns, 15 to 20 microns, 20 to 25 microns, 25 to 30 microns, 30 to 35 microns, 35 to 40 microns, or 40 to 50 microns, or any combination of ranges thereof.

In some embodiments, the guest-host mixture has a nematic-isotropic transition temperature TNI greater than 40° C. In other embodiments, the TNI is greater than 45° C., 50° C., 55° C., 60° C., 65° C., 70° C., 75° C., 80° C., 85° C. or 90° C.

The order parameter of the mixture can be determined by optical measurements of the light transmission in the resting and energized states using linearly and/or circularly polarized lights at several wavelengths both within and outside of the absorption spectrum. Then, using liquid crystal optics simulation methods such as those developed by Berreman, (Berreman D. W. 1972, Optics in Stratified and Anisotropic Media: 4×4-Matrix Formulation. Journal of the Optical Society of America, 62(4), 502). or Odano (Allia, P., Oldano, G., & Trossi, L., 1986, 4×4 Matrix approach to chiral liquid-crystal optics. Journal of the Optical Society of America B, 3(3), 424); the order parameter can be determined by numerical fitting to the experimental data. These simulation methods are used by those skilled in the art or through commercial programs such as Twisted Cell Optics by Kelly (Kelly, J., Jamal, S., & Cui, M., 1999, Simulation of the dynamics of twisted nematic devices including flow. Journal of Applied Physics, 86(8), 4091).

In some embodiments, the one or more cells of the LP-VTOD includes a guest-host mixture with an order parameter, $S_{mix}$, at the peak absorbance wavelength greater than or equal to 0.65, 0.7, 0.71, 0.72, 0.73, 0.74, 0.75, 0.76, 0.77 or 0.78, alternatively greater than or equal to 0.79 or 0.80.

Applications

The LP-VTOD has a wide variety of potential uses. For example, these devices may be directly fabricated into or laminated onto "wearable" products such as eyewear (such as prescription and non-prescription glasses and sunglasses), visors, goggles, face shields, near-eye displays, sensor optics, cameras, and AR/VR headsets to name a few. Alternatively, they may be directly fabricated into or laminated onto other products including, but not limited to, windows (vehicles, buildings, aircrafts, etc.), windshields, sunroofs, heads-up displays, camera filters, and optical instruments. Such products and devices may be further equipped with power supplies, batteries, sensors or the like. In some embodiments, the sensor(s) can provide information or data that is used in the operation of the LP-VTOD. Some non-limiting examples of sensors include a light sensor, an imaging sensor, and a laser warning receiver.

In some embodiments, one or more cells of the LP-VTOD may be divided into discrete, individually addressable regions to allow different regions of the LP-VTOD to display different states. In some cases, such regions may be formed by patterning the transparent conducting layer, optionally in combination with dividers to separate the electro-optic material into different sub-cells within the cell.

Example Embodiments

An LP-VTOD may be fabricated according to protocols similar to that described here. Each cell can be fabricated using isotropic substrates of 3 mil polycarbonate coated with Indium Thin Oxide (ITO), a transparent conductor. On top of the ITO, a coating of polyimide, e.g., Nissan 5661 (Nissan Chemical Industries, Ltd., Tokyo, Japan), may be applied. This polyimide coating can serve as an alignment layer designed to induce a strong homeotropic alignment of the liquid crystal molecules. Plastic spheres, e.g., 6.2 microns may be sprayed onto one of the substrates to act as spacers. A thin bead of UV-curable adhesive, e.g., Loctite 3106, (Henkel AG & Co. KGaA, Dusseldorf, Germany) may be applied around the perimeter of one of the substrates, leaving a gap that would serve as a fill port. The two substrates are assembled, pressed together against the spacers to create a uniform gap between the substrates, and then exposed to UV light to cure the adhesive.

Appropriate guest-host mixtures can be prepared for the first cell and the second cell. The cells can be laminated together using optically clear pressure sensitive adhesive. Each cell may be individually connected to a driving circuitry that could be used to apply a square wave voltage, e.g., at 60 Hz. Alternatively, the cells may be commonly connected to the drive circuitry so that a common voltage may be applied across both cells.

An LP-VTOD was constructed where the first and second cells were substantially the same with respect to their overall design and chemical composition. Each cell was filled with LC-Dye mixture AMI #905NC (AlphaMicron, Inc., Kent OH). The DC dye composition included a BODIPY (boron-dipyrromethene) dye having a narrow band light absorbing moiety with characteristics shown in Table 1. The first and second cells had a peak absorbance wavelength of about 522 nm. Some electro-optic properties are reported Table 1 and FIG. 7.

TABLE 1

| Voltage | PT | 522 nm | | 532 nm | | |
|---|---|---|---|---|---|---|
| (V) | % | % T | O.D. | % T | O.D. | FWHM |
| 0 | 68.2 | 25 | 0.6 | 32 | 0.5 | n/a |
| 16 | 49.7 | 0.6 | 2.2 | 1.0 | 2.0 | ~49 nm |

Figure 7:
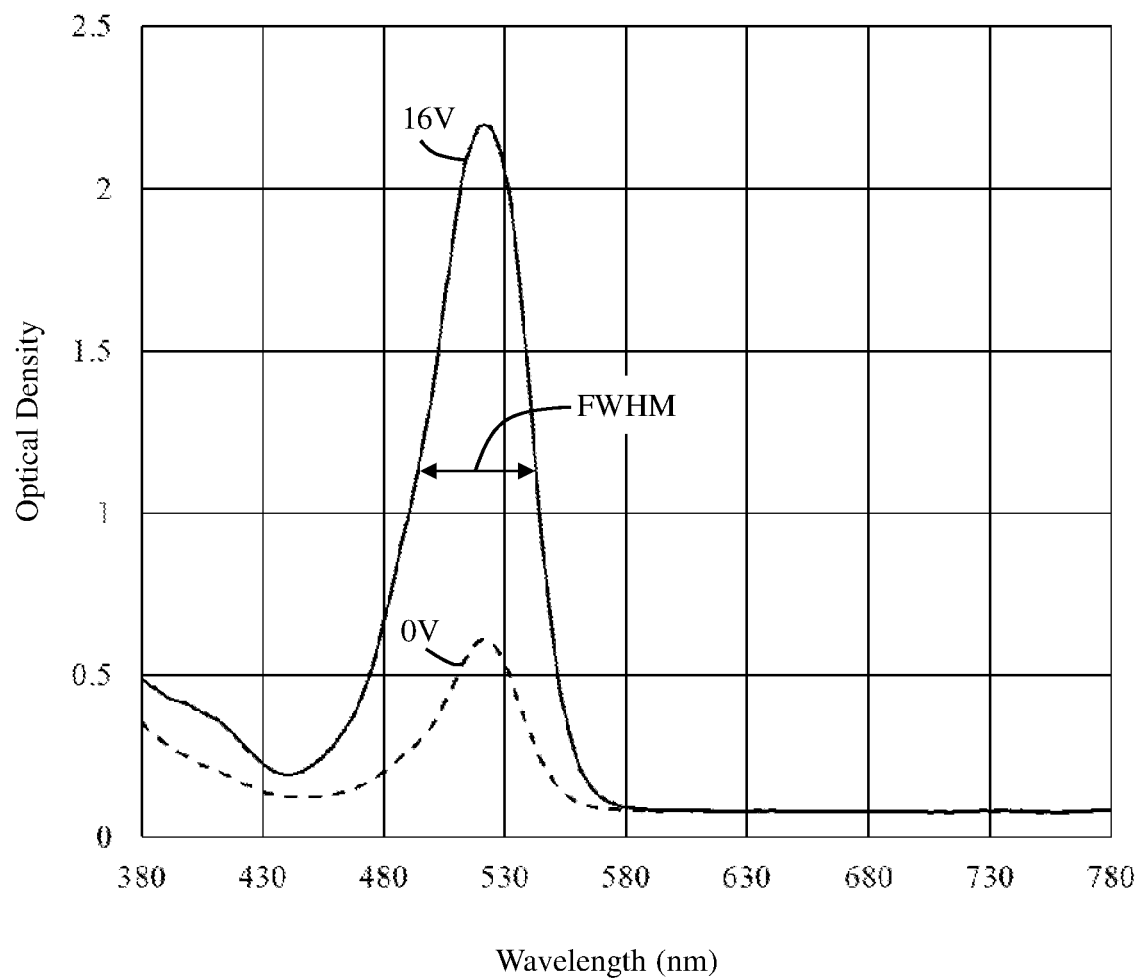
FIG. 7 illustrates optical density spectra of a non-limiting example of a LP-VTOD for clear and darkened states.

FIG. 7 shows a plot of optical density of the LP-VTOD as a function of wavelength at 0 V (clear state; dashed line) and at 16 V (darkened state, solid line). From these spectra, the photopic transmission (PT %) can be calculated and are reported in Table 1. The optical density at the peak absorbance wavelength (522 nm) and at a nearby common laser wavelength (532 nm) are also reported in Table 1. One can see that at 522 nm and even at 532 nm, a substantial increase in optical density (reduction in % T) can be achieved by the LP-VTOD while still maintaining a high photopic transmission. This is in part due to the low FWHM of the dye composition in its reduced transmission state of only about 49 nm. It is noted that even in the clear state, the LP-VTOD has some light absorption around 522 nm. While this may impart a slight magenta hue, in many applications it would not be objectionable. When necessary, this clear state tint can be at least partially corrected by adding a complementary light absorbing feature, e.g., a non-dichroic dye or pigment mixture added to the electro-optic mixture or as a separate layer to the LP-VTOD.

Still further embodiments herein include the following enumerated embodiments.

1. A laser protection variable transmission optical device ("LP-VTOD") including:
   a first cell including a first electro-optic material provided between a first pair of substrates, wherein the first electro-optic material is capable of changing from a state of higher light transmittance to a state of lower light transmittance in a first wavelength region upon a change in a first electric field applied across the first electro-optical material, and wherein the first cell is characterized by a narrow band absorption having a first peak absorption wavelength and a first FWHM of 175 nm or less; and
   a second cell in optical communication with the first cell, the second cell including a second electro-optic material provided between a second pair of substrates, wherein the second electro-optic material is capable of changing from a state of higher light transmittance to a state of lower light transmittance in a second wavelength region upon a change in a second electric field applied across the second electro-optical material, and wherein the second cell is characterized by a narrow band absorption having a second peak absorption wavelength and a second FWHM of 175 nm or less,
   wherein the LP-VTOD is capable of switching from a clear state to a darkened state having a darkened state transmittance % $T_{DS-P}$ that is equal to or less than 10% for at least one of the first or second peak absorption wavelengths.
2. The LP-VTOD of embodiment 1, wherein the first peak absorption wavelength is different than the second peak absorption wavelength.
3. The LP-VTOD of embodiment 1 or 2, wherein the first electro-optic material includes a first LC host and a first DC dye composition, the second electro-optic material includes a second LC host and a second DC dye composition, and the second DC dye composition is different than the first DC dye composition.
4. The LP-VTOD according to any of embodiments 1-3, wherein the first electro-optic material includes a first Narrow Band guest-host liquid crystal mixture having a narrow or ultra-narrow band absorption, the second electro-optic material includes a second Narrow Band guest-host liquid crystal mixture having a narrow or ultra-narrow band absorption, and the second Narrow Band guest-host liquid crystal mixture is different from the first Narrow Band guest-host liquid crystal mixture.
5. The LP-VTOD of embodiment 4, wherein the first and second Narrow Band guest-host liquid crystal mixtures have a different optical property selected from: peak absorption wavelength, FWHM absorption band, overall absorbance, or a combination thereof.
6. The LP-VTOD of embodiment 1, wherein the first peak absorption wavelength is substantially the same as the second peak absorption wavelength.
7. The LP-VTOD of embodiment 1 or 6, wherein the first electro-optic material includes a first LC host and a first DC dye composition, the second electro-optic material includes a second LC host and a second DC dye composition, and the second DC dye composition is substantially the same as the first DC dye composition.
8. The LP-VTOD according to any of embodiments 1, 6 or 7, wherein the first electro-optic material includes a first Narrow Band guest-host liquid crystal mixture having a narrow or ultra-narrow band absorption, the second electro-optic material includes a second Narrow Band guest-host liquid crystal mixture having a narrow or ultra-narrow band absorption, and the second Narrow Band guest-host liquid crystal mixture is substantially the same as the first Narrow Band guest-host liquid crystal mixture.
9. The LP-VTOD of embodiment 8, wherein the first and second Narrow Band guest-host liquid crystal mixtures have substantially the same optical property selected from: peak absorption wavelength, FWHM absorption band, overall absorbance, or a combination thereof.
10. The LP-VTOD according to any of embodiments 1-9, wherein the first and second peak absorption wavelengths are independently selected from the following ranges: 100-380 nm, 380-780 nm, 780-1300 nm, 1300-3000 nm, or 3000 nm-1 mm.
11. The LP-VTOD according to any of embodiments 1-10, wherein the first or second peak absorption wavelength is in a range of 380-780 nm.
12. The LP-VTOD according to any of embodiments 1-11, wherein the first and second peak absorption wavelengths are both in a range 380-780 nm, or optionally 400-700 nm.
13. The LP-VTOD according to any of embodiments 1-12, wherein the clear state has a clear state transmittance % $T_{CS-P}$ of at least 20% for the at least one peak absorption wavelength, or optionally at least 40%.
14 The LP-VTOD according to any of embodiments 1-13, wherein at each of the first and second peak absorption wavelengths, the LP-VTOD is capable of switching from a clear state having a % $T_{CS-P}$ of at least 20%, or optionally at least 40%, to a darkened state having a % $T_{DS-P}$ that is no more than 2.0%, or optionally no more than 1.0%.
15. The LP-VTOD according to any of embodiments 1-14, wherein switching between the clear state and the darkened state corresponds to a change in optical density, $\Delta OD$, of at least 1.0 for at least one of the first or second peak absorption wavelengths.
16. The LP-VTOD of embodiment 15, wherein $\Delta OD$ is at least 1.5 or optionally at least 2.0.
17. The LP-VTOD according to any of embodiments 1-16, wherein the clear state is characterized by a photopic transmission $PT_{CS}$ of at least 40%, or optionally at least 60%, and the darkened state is characterized by a photopic transmission $PT_{DS}$ of at least 10%, or optionally at least 20%.
18. The LP-VTOD of embodiment 17, wherein $PT_{CS}$ is greater than $PT_{DS}$ by more than 20 percentage units, or optionally by more than 30 percentage points.

19. The LP-VTOD of embodiment 17 or 18, wherein a ratio of $PT_{DS}/PT_{CS}$ is at least 0.25, or optionally at least 0.35, or optionally at least 0.5.
20. The LP-VTOD according to any of embodiments 1-19, wherein the darkened state is characterized by an optical density of at least 2.0 measured at 532 nm, or optionally an optical density of at least 2.5 measured at 532 nm.
21. The LP-VTOD according to any of embodiments 1-20, wherein at least one of the first and second FWHM is 88 nm or less, or optionally 80 nm or less, or optionally 70 nm or less, or optionally 60 nm or less.
22. The LP-VTOD according to any of embodiments 1-21, wherein the first cell includes a first alignment layer and the second cell includes a second alignment layer, and wherein an orientation of the first alignment layer is rotated by 70-110 degrees relative to an orientation of the second alignment layer.
23. The LP-VTOD according to any of embodiments 1-22, wherein the first cell is configured to absorb a first polarization of light more strongly than a second polarization of light, and the second cell is configured to absorb the second polarization of light more strongly than the first polarization of light, wherein the second polarization of light is substantially orthogonal to the first polarization of light.
24. The LP-VTOD according to any of embodiments 1-23, further including a third cell in optical communication with the first and second cells, the third cell including a third electro-optic material provided between a third pair of substrates, wherein the third electro-optic material is capable of changing from a state of higher light transmittance to a state of lower light transmittance in a third wavelength region upon a change in a third electric field applied across the third electro-optical material.
25. The LP-VTOD of embodiment 24, wherein the third cell is characterized by a narrow band absorption having a third peak absorption wavelength and a third FWHM of 175 nm or less.
26. The LP-VTOD of embodiment 25, wherein the third FWHM is 88 nm or less, or optionally 80 nm or less.
27. The LP-VTOD of embodiment 25 or 26, wherein the third peak absorption wavelength is in a range of 380 nm-780 nm.
28. The LP-VTOD of embodiment 25 or 26, wherein third peak absorption wavelength is within a range of 100-380 nm or 780 nm-1 mm.
29. The LP-VTOD of embodiment 24, wherein the third cell is characterized by a wide band absorption having a third FWHM of greater than 175 nm.
30. The LP-VTOD of embodiment 29, wherein the state of lower light transmittance of the third cell has a photopic transmission that is less than a photopic transmission of the state of higher transmittance of the third cell by at least 20%, or optionally by at least 40%.
31. The LP-VTOD of embodiment 29 or 30 wherein the state of lower light transmittance of the third cell is colorimetrically neutral.
32. The LP-VTOD according to any of embodiments 24-31, further including a fourth cell in optical communication with the first, second, and third cells, the fourth cell including a fourth electro-optic material provided between a fourth pair of substrates, wherein the fourth electro-optic material is capable of changing from a state of higher light transmittance to a state of lower light transmittance in a fourth wavelength region upon a change in a fourth electric field applied across the fourth electro-optical material.
33. The LP-VTOD of embodiment 32, wherein the fourth cell is characterized by a wide band absorption having a fourth FWHM of greater than 175 nm.
34. The LP-VTOD of embodiment 32 or 33, wherein the third and fourth cells operate cooperatively in their respective states of lower light transmittance to produce a combined photopic transmission that is less than a photopic transmission produced when the third and fourth cells are in their respective states of high light transmission by at least 20%, optionally by at least 40%.
35. The LP-VTOD of embodiment 34, wherein the combined photopic transmission is colorimetrically neutral.
36. An article of manufacture including an LP-VTOD according to any of embodiments 1-35, wherein the article of manufacture includes a camera filter, eyewear, a visor, goggles, a face shield, an AR/VR headset, a near-eye display, a window, a windshield, a sunroof, a heads-up display, or an optical instrument.
37. A method of operating the LP-VTOD device according to any of embodiments 1-29, method including changing the first electric field to switch the first cell from a state of higher light transmittance to a state of lower light transmittance.
38. The method of embodiment 37, further including changing the second electric field to switch the second cell from a state of higher light transmittance to a state of lower light transmittance.
39. The method of embodiment 38, wherein the first and second electric fields are independently controlled.
40. The method of embodiment 38, wherein the first and second electric fields are commonly controlled.
41. The method according any of embodiments 37-40, further including detecting by a sensor the presence of laser light incident on or near the LP-VTOD, wherein the sensor is provided in wired or wireless communication with the LP-VTOD.
42. The method of embodiment 41, wherein the sensing triggers one or both of the first or second electric fields to change.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

The invention claimed is:

1. A laser protection variable transmission optical device ("LP-VTOD") comprising:
a first cell comprising a first electro-optic material provided between a first pair of substrates, wherein the first electro-optic material is capable of changing from a state of higher light transmittance to a state of lower light transmittance in a first wavelength region upon a change in a first electric field applied across the first electro-optical material, and wherein the first cell is characterized by a narrow band absorption having a first peak absorption wavelength and a first FWHM of 175 nm or less; and
a second cell in optical communication with the first cell, the second cell comprising a second electro-optic material provided between a second pair of substrates, wherein the second electro-optic material is capable of changing from a state of higher light transmittance to a state of lower light transmittance in a second wavelength region upon a change in a second electric field applied across the second electro-optical material, and wherein the second cell is characterized by a narrow band absorption having a second peak absorption wavelength and a second FWHM of 175 nm or less,
wherein the LP-VTOD is capable of switching from a clear state to a darkened state having a darkened state transmittance % $T_{DS-P}$ that is equal to or less than 10% for at least one of the first or second peak absorption wavelengths,
and wherein both the first and second peak absorption wavelengths are in a range of 380-780 nm.

2. The LP-VTOD of claim 1, wherein the first peak absorption wavelength is different than the second peak absorption wavelength.

3. The LP-VTOD of claim 1, wherein the first and second peak absorption wavelengths are independently selected from the following ranges: 100-380 nm, 380-780 nm, 780-1300 nm, 1300-3000 nm, or 3000 nm-1 mm.

4. The LP-VTOD of claim 1, wherein the clear state has a clear state transmittance % $T_{CS-P}$ of at least 20% for the at least one peak absorption wavelength.

5. The LP-VTOD of claim 4, wherein at each of the first and second peak absorption wavelengths, the LP-VTOD is capable of switching from a % $T_{CS-P}$ of at least 30% to a % $T_{DS-P}$ that is no more than 1.0%.

6. The LP-VTOD of claim 1, wherein switching between the clear state and the darkened state corresponds to a change in optical density, $\Delta OD$, of at least 1.0 for at least one of the first or second peak absorption wavelengths.

7. The LP-VTOD of claim 1, wherein the first electro-optic material comprises a first LC host and a first DC dye composition, the second electro-optic material comprises a second LC host and a second DC dye composition, and the second DC dye composition is different than the first DC dye composition.

8. The LP-VTOD of claim 1, wherein the first peak absorption wavelength is substantially the same as the second peak absorption wavelength.

9. The LP-VTOD of claim 1, wherein the clear state is characterized by a photopic transmission $PT_{CS}$ of at least 40% and the darkened state is characterized by a photopic transmission $PT_{DS}$ of at least 10%.

10. The LP-VTOD of claim 9, wherein the $PT_{CS}$ is greater than the $PT_{DS}$ by more than 20 percentage units.

11. The LP-VTOD of claim 9, wherein a ratio of $PT_{DS}/PT_{CS}$ is at least 0.35.

12. The LP-VTOD of claim 1, wherein the first electro-optic material comprises a first Narrow Band guest-host liquid crystal mixture having a narrow or ultra-narrow band absorption, and the second electro-optic material comprises a second Narrow Band guest-host liquid crystal mixture having a narrow or ultra-narrow band absorption.

13. The LP-VTOD of claim 12, wherein the first and second Narrow Band guest-host liquid crystal mixtures have substantially the same optical performance selected from: peak absorption wavelength, FWHM absorption band, overall absorbance, or a combination thereof.

14. The LP-VTOD of claim 1, wherein the darkened state is characterized by an optical density of at least 2.0 measured at 532 nm.

15. The LP-VTOD of claim 1, wherein at least one of the first and second FWHM is 60 nm or less.

16. The LP-VTOD of claim 1, further comprising a third cell in optical communication with the first and second cells, the third cell comprising a third electro-optic material provided between a third pair of substrates, wherein the third electro-optic material is capable of changing from a state of higher light transmittance to a state of lower light transmittance in a third wavelength region upon a change in a third electric field applied across the third electro-optical material.

17. The LP-VTOD of claim 16, wherein the third cell is characterized by a narrow band absorption having a third peak absorption wavelength and a third FWHM of 175 nm or less.

18. The LP-VTOD of claim 16, wherein the third cell is characterized by a wide band absorption having a third FWHM of greater than 175 nm.

19. The LP-VTOD of claim 18, wherein the state of lower light transmittance of the third cell has a photopic transmission that is less than a photopic transmission of the state of higher transmittance of the third cell by at least 30%.

20. The LP-VTOD of claim 18, wherein the state of lower light transmittance of the third cell is colorimetrically neutral.

21. An article of manufacture comprising the LP-VTOD of claim 1, wherein the article of manufacture includes a camera filter, eyewear, a visor, goggles, a face shield, an AR/VR headset, a near-eye display, a window, a windshield, a sunroof, a heads-up display, or an optical instrument.

22. A laser protection variable transmission optical device ("LP-VTOD") comprising:
   a first cell comprising a first electro-optic material provided between a first pair of substrates, wherein the first electro-optic material is capable of changing from a state of higher light transmittance to a state of lower light transmittance in a first wavelength region upon a change in a first electric field applied across the first electro-optical material, and wherein the first cell is characterized by a narrow band absorption having a first peak absorption wavelength and a first FWHM of 175 nm or less; and
   a second cell in optical communication with the first cell, the second cell comprising a second electro-optic material provided between a second pair of substrates, wherein the second electro-optic material is capable of changing from a state of higher light transmittance to a state of lower light transmittance in a second wavelength region upon a change in a second electric field applied across the second electro-optical material, and wherein the second cell is characterized by a narrow band absorption having a second peak absorption wavelength and a second FWHM of 175 nm or less,
   wherein the LP-VTOD is capable of switching from a clear state to a darkened state having a darkened state transmittance % $T_{DS\text{-}P}$ that is equal to or less than 10% for at least one of the first or second peak absorption wavelengths,
   and wherein the first peak absorption wavelength is substantially the same as the second peak absorption wavelength.

23. An article of manufacture comprising the LP-VTOD of claim 22, wherein the article of manufacture includes a camera filter, eyewear, a visor, goggles, a face shield, an AR/VR headset, a near-eye display, a window, a windshield, a sunroof, a heads-up display, or an optical instrument.

24. The LP-VTOD of claim 22, wherein the clear state is characterized by a photopic transmission $PT_{CS}$ of at least 40% and the darkened state is characterized by a photopic transmission $PT_{DS}$ of at least 10%.

25. The LP-VTOD of claim 24, wherein the $PT_{CS}$ is greater than the $PT_{DS}$ by more than 20 percentage units.

26. The LP-VTOD of claim 24, wherein a ratio of $PT_{DS}/PT_{CS}$ is at least 0.35.

27. The LP-VTOD of claim 22, wherein the first electro-optic material comprises a first Narrow Band guest-host liquid crystal mixture having a narrow or ultra-narrow band absorption, and the second electro-optic material comprises a second Narrow Band guest-host liquid crystal mixture having a narrow or ultra-narrow band absorption.

28. The LP-VTOD of claim 27, wherein the first and second Narrow Band guest-host liquid crystal mixtures have substantially the same optical performance selected from: FWHM absorption band, overall absorbance, or a combination thereof.

29. The LP-VTOD of claim 22, wherein the darkened state is characterized by an optical density of at least 2.0 measured at 532 nm.

30. The LP-VTOD of claim 22, wherein at least one of the first and second FWHM is 60 nm or less.

31. The LP-VTOD of claim 22, further comprising a third cell in optical communication with the first and second cells, the third cell comprising a third electro-optic material provided between a third pair of substrates, wherein the third electro-optic material is capable of changing from a state of higher light transmittance to a state of lower light transmittance in a third wavelength region upon a change in a third electric field applied across the third electro-optical material.

32. The LP-VTOD of claim 31, wherein the third cell is characterized by a narrow band absorption having a third peak absorption wavelength and a third FWHM of 175 nm or less.

33. The LP-VTOD of claim 31, wherein the third cell is characterized by a wide band absorption having a third FWHM of greater than 175 nm.

34. The LP-VTOD of claim 31, wherein the state of lower light transmittance of the third cell is colorimetrically neutral.

* * * * *